United States Patent
Kawano et al.

[11] Patent Number: 6,141,746
[45] Date of Patent: Oct. 31, 2000

[54] INFORMATION PROCESSOR

[75] Inventors: Hiroshi Kawano; Takeo Asakawa, both of Kanagawa, Japan

[73] Assignee: Fujitsu Limited, Kawasaki, Japan

[21] Appl. No.: 09/040,324

[22] Filed: Mar. 18, 1998

[30] Foreign Application Priority Data

Oct. 20, 1997 [JP] Japan ...................................... 9-287081

[51] Int. Cl.[7] ...................................................... G06F 9/30
[52] U.S. Cl. .......................................................... 712/214
[58] Field of Search .............................. 712/23, 208, 214

[56] References Cited

U.S. PATENT DOCUMENTS

| | | | |
|---|---|---|---|
| 4,942,525 | 7/1990 | Shintani et al. | 364/200 |
| 5,471,593 | 11/1995 | Branigin et al. | 395/375 |
| 5,630,157 | 5/1997 | Dwyer | 395/800 |
| 5,689,674 | 11/1997 | Griffith et al. | 395/393 |
| 5,699,537 | 12/1997 | Sharangpani et al. | 395/393 |

FOREIGN PATENT DOCUMENTS

| | | |
|---|---|---|
| 61-283930 | 12/1986 | Japan. |
| 3-245223 | 10/1991 | Japan. |
| 4-54638 | 2/1992 | Japan. |
| 5-197547 | 8/1993 | Japan. |

Primary Examiner—David Y. Eng
Attorney, Agent, or Firm—Staas & Halsey LLP

[57] ABSTRACT

An information processor having a control unit in which a plurality of instructions to simultaneously be executed are decoded by a decoder section, an executing unit to be dispatched of a plurality of executing units is selected by an index selecting section according to a result of the decoding, and dispatch to any of the plurality of executing units is inhibited by a dispatch inhibiting section according to a result of the decoding by the decoder section as well as to a result of the selection by the index selecting section.

15 Claims, 16 Drawing Sheets

FIG.5

| FIRST INSTRUCTION | | INDEX USED | | NOT USED | |
|---|---|---|---|---|---|
| SECOND INSTRUCTION | | IDENTICAL INDEX | NOT USED | NOT IDENTICAL | INDEX USED | NOT USED |
| SECOND INSTRUCTION ALLOCATED | PERMITTED | PERMITTED | NOT PERMITTED | PERMITTED | PERMITTED |

CONDITION UNDER WHICH SECOND INSTRUCTION IS ALLOCATED TO EXECUTING UNIT

FIG.6

| FIRST INSTRUCTION | INDEX USED | | | | NOT USED | | | |
|---|---|---|---|---|---|---|---|---|
| SECOND INSTRUCTION | ⟨NOT DEPENDENT⟩ | | | | | | | |
| THIRD INSTRUCTION | IDENTICAL INDEX | | NOT USED | NOT IDENTICAL | IDENTICAL INDEX | NOT USED | NOT IDENTICAL | INDEX USED | NOT USED |
| THIRD INSTRUCTION ALLOCATED | PERMITTED | PERMITTED | NOT PERMITTED | PERMITTED | PERMITTED | NOT PERMITTED | PERMITTED | PERMITTED |

CONDITION UNDER WHICH THIRD INSTRUCTION IS ALLOCATED TO EXECUTING UNIT (ENTRY CONTENTS)

| V1 | R1 | A1 | V2 | R2 | A2 |
|----|----|----|----|----|----|

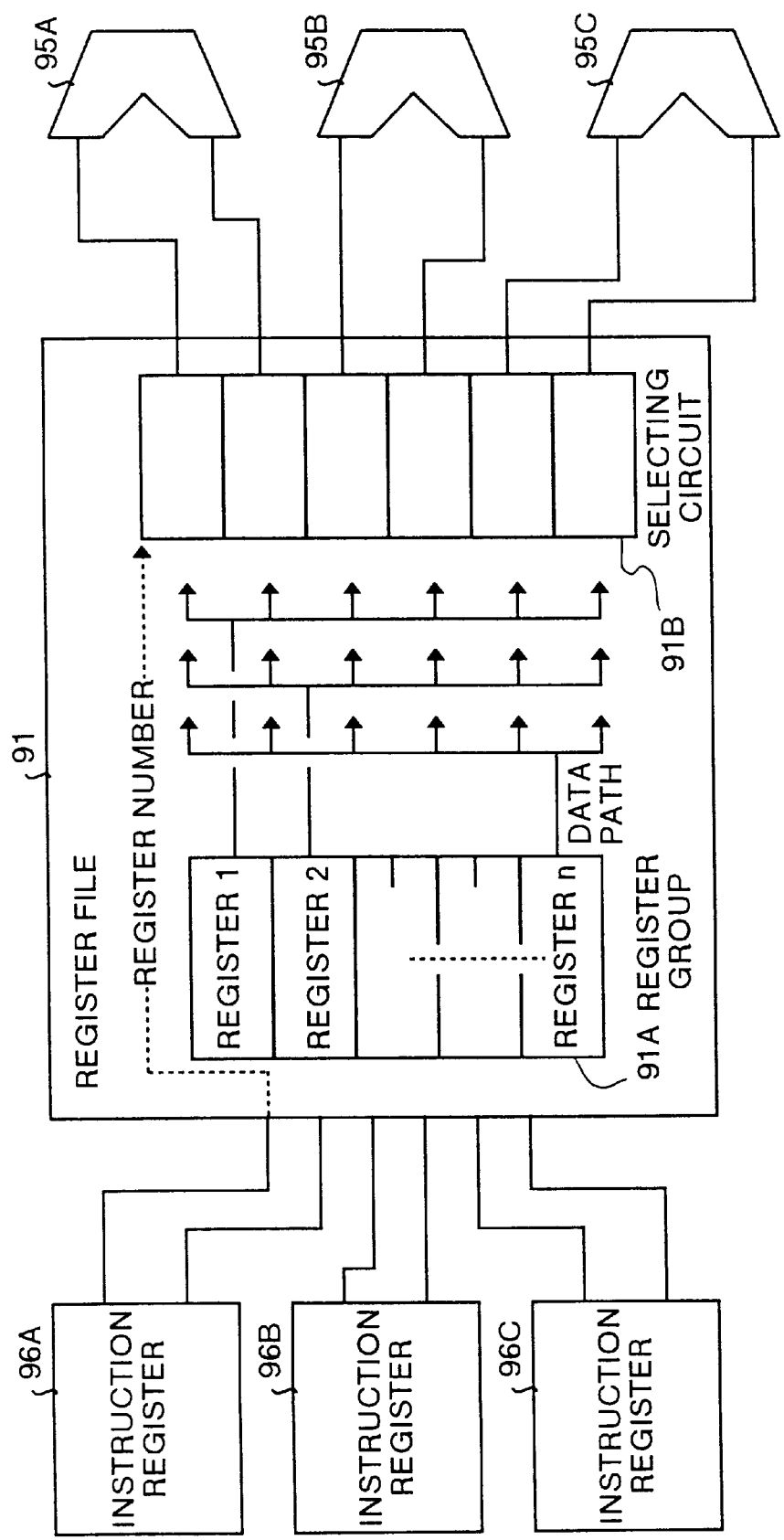

INFORMATION PROCESSOR

FIELD OF THE INVENTION

The present invention relates to an information processor, and more particularly to an information processor for decoding an instruction with a plurality of registers as a source operand and also dispatching an execution unit according to the result of decoding.

BACKGROUND OF THE INVENTION

In recent years, the processing capability of a microprocessor has been improved in association with progress in the semiconductor manufacturing technology. As representative architecture for a microprocessor, there are the VLIW (very Long Instruction Word) and super scalar. The processor employing those architecture can simultaneously have a plurality of processing executed with a plurality of pipe lines. However, the processor based on pipe-line structure successively executes processing for each of the pipe lines, and for this reason, it is required to increase the number of pipe lines for processing instructions at a higher speed.

When an information processor executes instructions in a superscalar type of processor, for example, data on a main storage device is referred to as a source operand according a large number of instructions. As a system of generating a data address on a main storage device from each instruction, generally three values of a base register, an index register and displacement are added to each other.

Description is made herein for a conventional type of configuration of the processor. FIG. 16 shows block configuration of an information processor employing the system described above. In FIG. 16, an instruction CMD comprises OP (operand) code, a value RI indicating that a register number 1 is Operand 1, a value B2 indicating a base register number, a value X2 for an index register number, and a value D2 for displacement.

The information processor comprises, as shown in FIG. 16, a register file 91, latches 92, 93, 94, and an adder 95. The register file 91 reads a value B2 for a base register number as well as a value X2 for an index register number, and outputs the values to the latches 93, 94 each provided in the further latter stage.

The latch 92 reads a value D2 for displacement directly from an instruction CMD and outputs the value to the adder 95 at the next timing. The latches 93 and 94 read a value B2 for a base register number and a value X2 for an index register number from the register file 91 respectively and output the values to the adder 95 at the next timing.

The latch 92 directly fetches therein information for the instruction CMD, but the latches 93 and 94 fetch therein information for the instruction CMD via the register file 91. The adder 95 fetches therein all the values stored in the latches 2, 93 and 94 for addition and generates a data address on the main storage device.

Provided in the configuration shown in FIG. 16 are a pair (two units) of read ports for the register file 91 to one instruction CMD. When a plurality of instructions are to be simultaneously executed, processing may successively be executed by using the pair of read ports provided in the register file 91, but the processing is in turn delayed.

For this reason, in order to speed up the processing, it is conceivable that the number of pairs of read ports for the register file 91 are extensively provided according to the number of instructions to simultaneously be executed. If there are three instructions to simultaneously be executed, three pairs of read ports for the register file 91 may be provided therein. Provision of three pairs of read ports therein requires three data paths for reading registers. Description is made hereinafter for the configuration.

In order to execute processing for instructions at a high speed, in the information processor for simultaneously decoding and executing a plurality of instructions, it is one of solutions to provide the number of read ports for a base register as well as for an index register, said number equal to the number of instructions to be simultaneously decoded in the information processor, for adapting hardware thereof to execution of instructions in an ordinary instruction format with the configuration shown in FIG. 16.

FIG. 17 is a block diagram showing hardware configuration of the information processor based on the conventional technology. Configuration of latches is omitted in the information processor shown in FIG. 17 for simplifying description thereof. This information processor has instruction registers 96A, 96B, and 96C with instructions stored therein respectively. Instructions read out from the instruction registers 96A, 96B, and 96C are fetched in the register file 91. Namely, a value for a base register number as well as a value for an index register number are read out as a pair from the instruction registers 96A, 96B, and 96C respectively. For this reason, pipe lines number three times as many as that in the configuration shown in FIG. 16 are provided in a space between the instruction registers 96A, 96B, 96C and the register file 91.

The register file 91 has a register group 91A and selecting circuits 91B or the like. In this register file 91, assuming that the number of registers is n units (n: a natural number), data paths are required by a number obtained by multiplying the number of ports required for reading by n. Accordingly, the register group 91A and the selecting circuits 91B are connected to each other with required data paths.

Each of the selecting circuits 91B fetches a value for a base register number as well as a value for an index register number for each instruction read out from the register group 91A via a data path, selects each of corresponding adders 95A, 95B and 95C respectively, and outputs the values thereto.

The adder 95A corresponds to an instruction for the instruction register 96A, and adds all of three values for the base register, index register and displacement to each other to obtain a data address. The adder 95B corresponds to an instruction for the instruction register 96B, and adds all of three values for the base register, index register and displacement to each other to obtain a data address. The adder 95C corresponds to an instruction for the instruction register 96C, and adds all of three values for the base register, index register and displacement to each other to obtain a data address.

With the configuration described above, the number of read ports for the register file 91 shown in FIG. 17 is three times as many as that shown in FIG. 16. Accordingly, the register file 91 in FIG. 17 simultaneously reads out three instructions from the instruction registers 96A, 96B, and 96C. Namely, in the register file 91, when each value for a base register number and each value for an index register number are read out from the instruction registers 96A, 96B, and 96C respectively, each of the values is taken out from the register group 91A.

Then, each of the values read out from the register group 91A is sent to each of the selecting circuits 91B via the data path, and then is outputted to each of the adders 95A, 95B, and 95C respectively connected to the selecting circuits 91B for each instruction. In the adders 95A, 95B, and 95C, each of the values (a value for a base register number and a value for an index register number) received from the selecting circuits 91B and each value for a displacement, which is not shown, directly received from each of the instruction registers 96A, 96B, and 96C are added to each other. A result of the addition is a data address.

It should be noted that, as a technology similar to this type of technology, there are those, for example, disclosed in Japanese Patent Laid-Open Publication No. SHO 61-283930, Japanese Patent Laid-Open Publications No. HEI 3-245223, No. HEI 4-54638, and No. HEI 5-197547 in the same Publication.

By the way, as the conventional type of information processor speeds up a processing speed according to the number of instructions to simultaneously be executed by extensively providing the number of pipe lines and adders therein, the number of selecting circuits 91B for reading data from each register in the register group 91A increases in the register file 91, which causes increase in an amount of hardware as well as in a machine cycle as a result.

In the existing software, when simultaneously processing a group of instructions close to each other, generally an index register is not used (a register number is zero), or there are many cases that the same index register is used for all the instructions. There has been thus desired, from the view point of a chip area and a machine cycle, a method of realizing simultaneous decoding and execution of a plurality of instructions without increasing the number of read ports for registers.

SUMMARY OF THE INVENTION

It is an object of the present invention to provide an information processor which can simultaneously decode and execute a plurality of instructions for executing processing for instructions at a high speed and also realize configuration therefor without a significant increase in an amount of hardware.

With the present invention, in a control unit, a plurality of instructions to simultaneously be executed are decoded, an executing unit to be dispatched, of a plurality of executing units, is selected according to a result of decoding, and an operation for dispatching any of the plurality of executing units is inhibited according to a result of the decoding as well as to a result of the selection, so that the processing for instructions can be executed at a high speed by simultaneously decoding and executing a plurality of instructions and the high speed execution can be realized with a minimum amount of hardware without extensive provision of data paths for reading registers therein.

With the present invention, a plurality of instructions to simultaneously be executed are decoded, and then in a control unit, an executing unit to be dispatched, of a plurality of executing units, is selected according to a result of decoding, and an operation for dispatching any of the plurality of executing units is inhibited according to a result of the decoding as well as to a result of the selection, so that the processing for instructions can be executed at a high speed by simultaneously decoding and executing a plurality of instructions and the high speed execution can be realized with a minimum amount of hardware without extensive provision of data paths for reading registers therein.

With the present invention, in a control unit, an executing unit to be dispatched, of a plurality of executing units, is selected according to a result of decoding a plurality of instructions to simultaneously be executed outside the unit as well as to a result of decoding the plurality of instructions inside the unit, and an operation for dispatching any of the plurality of executing units is inhibited according to a result of the decoding as well as to a result of the selection, so that the processing for instructions can be executed at a high speed by simultaneously decoding and executing a plurality of instructions and the high speed execution can be realized with a minimum amount of hardware and without extensive provision of data paths for reading registers therein.

With the present invention, a source operand for an instruction not dispatched to each of the executing units under control by the control unit is stored in a decoding/storing unit, so that a following instruction to be executed can be stored in a device outside the control unit.

With the present invention, when a first instruction is using a particular source operand, if a following second instruction uses a different source operand, dispatch to an executing unit correlating to the second instruction is inhibited, so that, for preferential execution of the first instruction among a plurality of instructions, if a following instruction (second instruction) can share the particular source operand, simultaneous execution thereof is allowed and the simultaneous processing of a plurality of instructions is realized, and on the other hand, if the following instruction (second instruction) can not share the particular source operand, the instruction can be excluded from the simultaneous processing.

With the present invention, when a first instruction is using a particular source operand, if a third instruction, which is an instruction two pieces later, uses a different source operand, dispatch to an executing unit corresponding to the third instruction is inhibited, and when the first instruction does not use any source operand and a second instruction is using a particular source operand, if the following third instruction uses a different source operand, dispatch to an executing unit correlating to the third instruction is inhibited, so that, for preferential execution of the first instruction or the second instruction among a plurality of instructions, if a following instruction can share the particular source operand, simultaneous execution thereof is allowed and the simultaneous processing of a plurality of instructions is realized, and on the other hand, if the following instruction can not share the particular source operand, the instruction can be excluded from the simultaneous processing.

Other objects and features of this invention will become understood from the following description with reference to the accompanying drawings.

BRIEF DESCRIPTION OF THE DRAWING

FIG. 5 is an explanatory view for explaining conditions under which a second instruction is allocated to an executing unit in a table form in Embodiment 1;

FIG. 6 is an explanatory view for explaining conditions under which a third instruction is allocated to an executing unit in a table form in Embodiment 1;

FIG. 17 is a block diagram concretely showing the information processor based on the conventional technology.

DESCRIPTION OF THE PREFERRED EMBODIMENTS

Detailed description is made hereinafter for the preferred embodiments of the information processor according to the present invention with reference to accompanying drawings.

Figure 1:
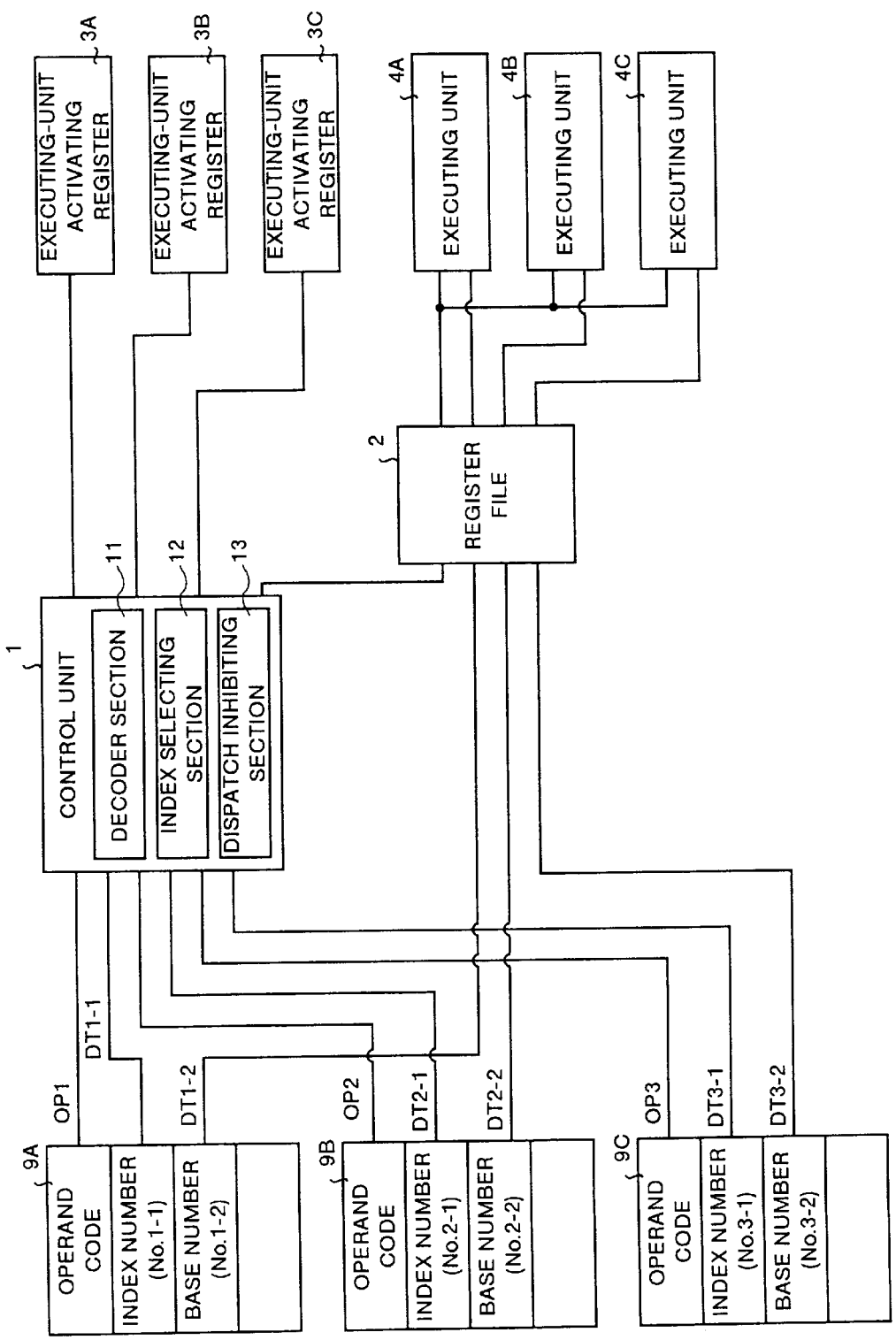
FIG. 1 is a block diagram showing configuration of an information processor according to Embodiment 1 of the present invention.

Description is made, at first, for configuration. FIG. 1 is a block diagram showing configuration of an information processor according to Embodiment 1 of the present invention. FIG. 1 shows the information processor in a case where there are three instructions to simultaneously be executed. This information processor comprises, as shown in FIG. 1, a control unit 1, a register file 2, executing-unit activating registers 3A, 3B and 3C, executing units 4A, 4B and 4C, and instruction registers 9A, 9B and 9C.

Stored in the instruction registers 9A, 9B, 9C are a first instruction, a second instruction, and a third instruction respectively. The first instruction comprises an operand code OP1, an index number DT1-1 and a base number DT1-2. The second instruction comprises an operand code OP2, an index number DT2-1 and a base number DT2-2, and the third instruction comprises an operand code OP3, an index number DT3-1 and a base number DT3-2.

In the instruction register 9A, the operand code OP1 and the index number DT1-1 are outputted to a decoder section 11 for the control unit 1, and the base number DT1-2 is outputted to the register file 2. In the instruction register 9B, the operand code OP2 and the index number DT2-1 are outputted to the decoder section 11 for the control unit 1, and the base number DT2-2 is outputted to the register file 2. In the instruction register 9C, the operand code OP3 and the index number DT3-1 are outputted to the decoder section 11 for the control unit 1, and the base number DT3-2 is outputted to the register file 2.

The control unit 1 comprises the decoder section 11, an index selecting section 12, and a dispatch inhibiting section 13. The decoder section 11 simultaneously fetches therein three instructions from the instruction registers 9A, 9B, 9C and decodes the instructions. The index selecting section 12 selects an index number according to a result of decoding by the decoder section 11 and outputs the selected index number to the register file 2. The dispatch inhibiting section 13 sends out a control signal for setting activation to the executing-unit activating registers 3A, 3B, 3C and a control signal for inhibiting the setting (dispatch) according to a result of decoding by the decoder section 11 as well as to a result of selection by the index selecting section 12.

The register file 2 outputs only an output for a register number corresponding to each of the base numbers DT1-2, DT2-2, DT3-2 from the instruction registers 9A, 9B, 9C as well as to an index number selected by the control unit 1.

The executing-unit activating registers 3A, 3B, 3C are registers each for setting a control signal to activate each of the executing units 4A, 4B, 4C respectively. When a control signal for setting activation is set in each of the executing-unit activating registers 3A, 3B, 3C, dispatch is allowed, and on the other hand, when the signal for activation is not set, namely when a control signal to inhibit the dispatch is set, the dispatch is inhibited. The executing units 4A, 4B, 4C operate according to instructions from the instruction registers 9A, 9B, 9C respectively, and whether the dispatch is to be executed or not is controlled according to each control signal set in each of the executing-unit activating registers 3A, 3B, and 3C.

In the configuration described above, the operand codes OP, index numbers DT1-1, 2-1, 3-1 are sent out to the control unit 1, and the base numbers DT1-2, 2-2, 3-2 are directly sent out to the register file 2. Sent from the control unit 1 are an index number DT1-n (n=1, 2 or 3) selected out of the three instructions (instruction registers 9A, 9B, 9C) to the register file and a control signal for setting each of the executing-unit activating registers 3A, 3B, and 3C thereto.

Figure 2:
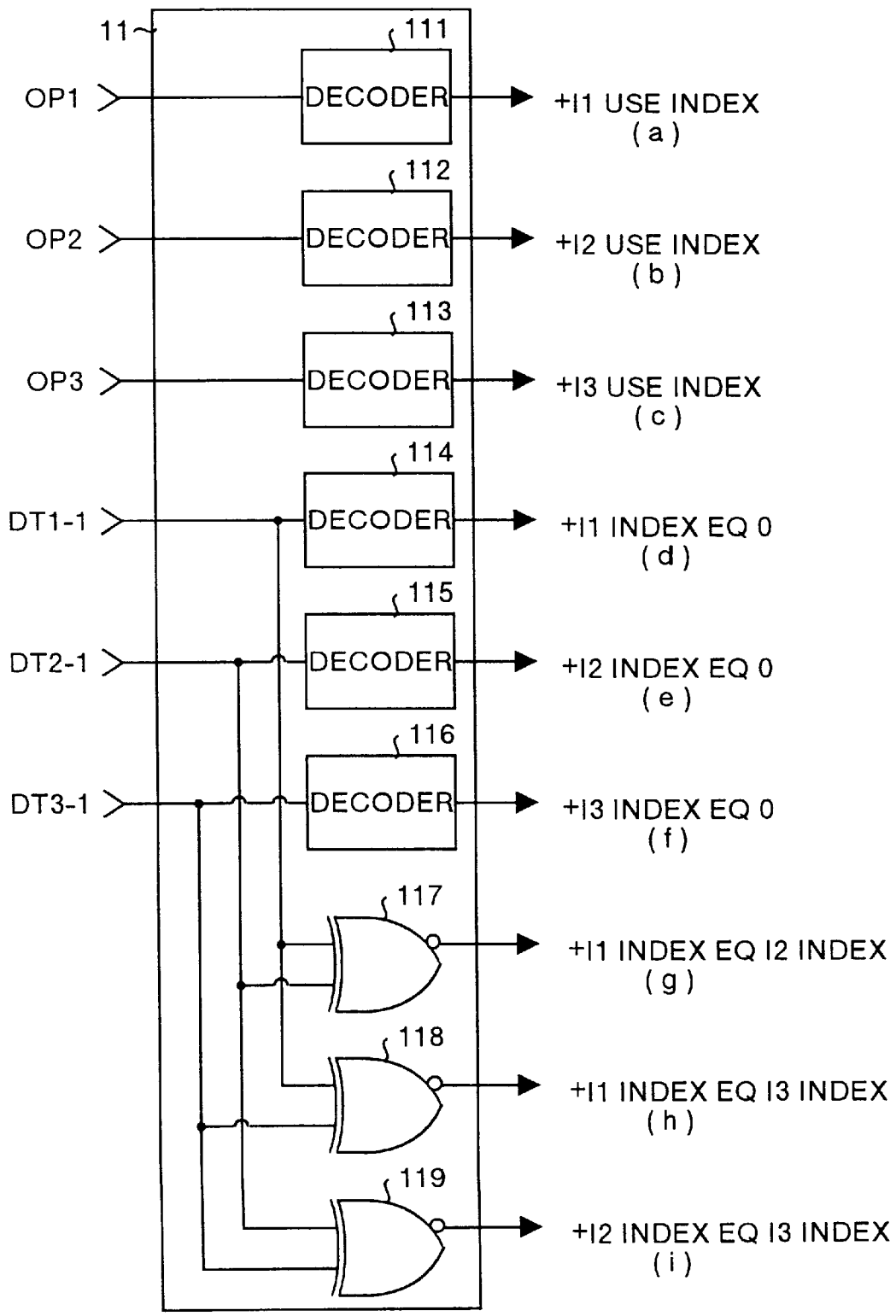
FIG. 2 is a circuit diagram showing configuration of a decoder section for a control unit shown in FIG. 1.
Figure 3:
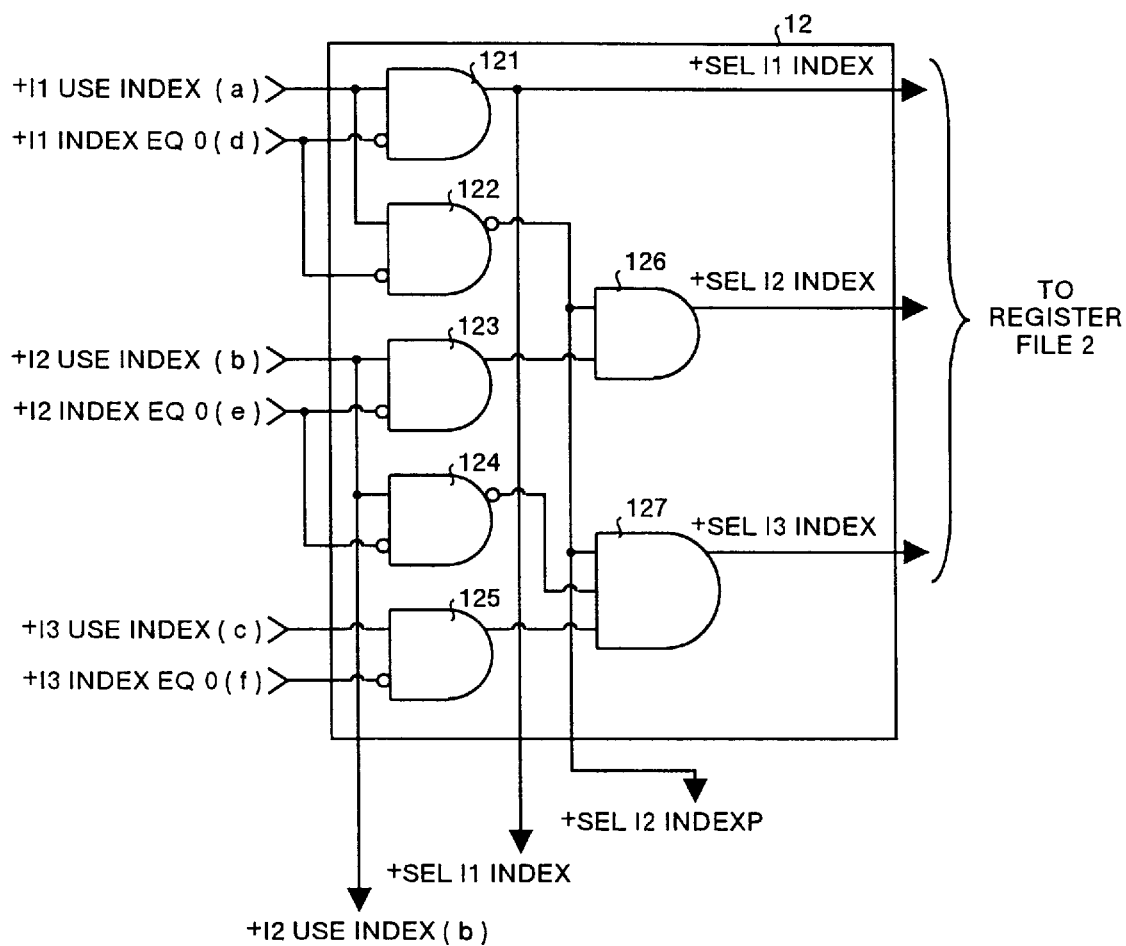
FIG. 3 is a circuit diagram showing configuration of an index selecting section for the control unit shown in FIG. 1.
Figure 4:
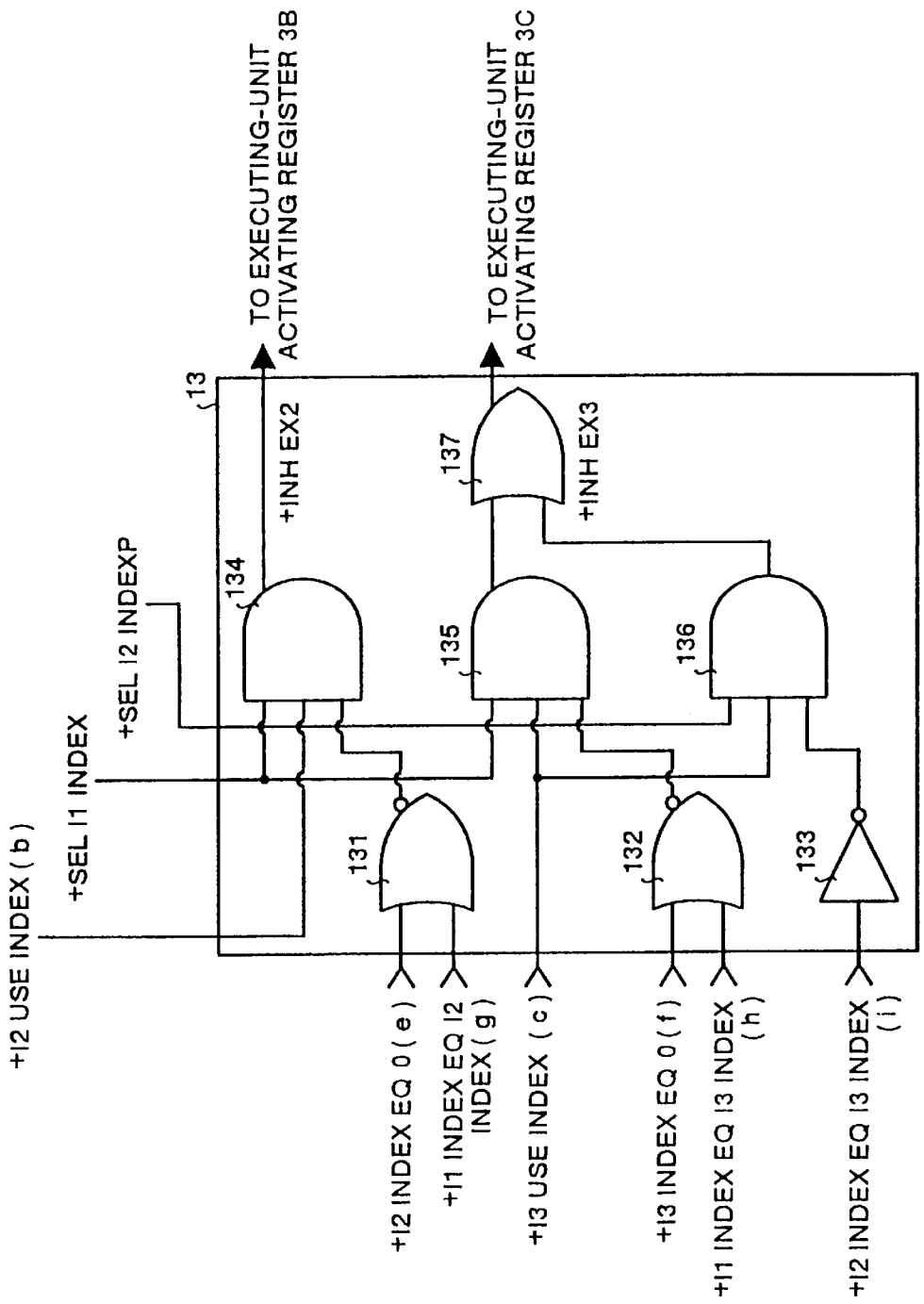
FIG. 4 is a circuit diagram showing configuration of a dispatch inhibiting section for the control unit shown in FIG. 1.

Next detailed description is made for the control unit 1. FIG. 2, FIG. 3 and FIG. 4 are circuit diagrams showing each configuration of the decoder section 11, index selecting section 12, and the dispatch inhibiting section 13 for the control unit shown in FIG. 1 respectively.

At first, description is made for the decoder section 11 with reference to FIG. 2. The decoder section 11 shown in FIG. 2 comprises decoders 111 to 116 and EXNOR circuits 117 to 119. The decoders 111, 112, 113 fetch therein the operand codes OP1, OP2, OP3 from the instruction registers 9A, 9B, 9C, decode the operand codes, and output the decoded codes to the index selecting section 12 respectively.

The decoders 114, 115, 116 fetch therein the index numbers DT1-1, DT2-1, DT3-1 from the instruction registers 9A, 9B, 9C, decode the numbers, and output the decoded numbers to the index selecting section 12 and the dispatch inhibiting section 13 respectively. The EXNOR circuits 117, 118, 119 fetch therein the index numbers DT1-1 and DT2-1, DT1-1 and DT3-1, DT2-1 and DT3-1 from the instruction registers 9A, 9B, 9C to obtain an exclusive OR between each pair of the numbers respectively and output each result to the dispatch inhibiting section 13.

Outputs from the decoders 111 to 116 are a signal (a) "+I1 USE INDEX", a signal (b) "+I2 USE INDEX", a signal (c) "+I3 USE INDEX", a signal (d) "+I1 INDEX EQ 0", a signal (e) "+I2 INDEX EQ 0", and a signal (f) "+I3 INDEX EQ 0", respectively.

Outputs from the EXNOR circuits 117, 118, 119 are a signal (g) "+I1 INDEX EQ I2 INDEX", asignal (h) "+I1 INDEX EQ I3 INDEX", and a signal (i) "+I2 INDEX EQ I3 INDEX", respectively.

The signal (a) "+I1 USE INDEX" is generated by decoding the operand code OP1 for the instruction register 9A in the decoder 111, and is "1" when a first instruction uses the index number DT1-1. The signal (b) "+I2 USE INDEX" is generated by decoding the operand code OP2 for the instruction register 9B in the decoder 112, and is "1" when a second instruction uses the index number DT2-1. The signal (c) "+I3 USE INDEX" is generated by decoding the operand code OP3 for the instruction register 9C in the decoder 113, and is "1" when a third instruction uses the index number DT3-1.

Also, the signal (d) "+I1 INDEX EQ 0 (zero)" is "1" when the index number for the first instruction is zero in the decoder 114. This value "1" indicates that no index number is used. The signal (e) "+I2 INDEX EQ ZERO" is "1" when the index number for the second instruction is zero in the decoder 115. This value "1" indicates that no index number is used. The signal (f) "+I3 INDEX EQ ZERO" is "1" when the index number for the third instruction is zero in the decoder 116. This value "1" indicates that no index number is used.

Also, the signal (g) "+I1 INDEX EQ I2 INDEX" is "1" when the index number for the first instruction is equal to that for the second instruction in the EXNOR circuit 117, and is "0" when both of the numbers are not equal to each other. The signal (h) "+I1 INDEX EQ I3 INDEX" is "1" when the index number for the first instruction is equal to that for the third instruction in the EXNOR circuit 118, and is "0" when both of the numbers are not equal to each other. The signal (i) "+I2 INDEX EQ I3 INDEX" is "1" when the index number for the second instruction is equal to that for the third instruction in the EXNOR circuit 119, and is "0" when both of the numbers are not equal to each other.

Concerning the signals (a) to (f) described above, the signals (a) to (f) are outputted to the index selecting section 12, and the signals (c), (e) and (f) of the above signals are also outputted to the dispatch inhibiting section 13. Also, the signals (g), (h) and (i) are outputted to the dispatch inhibiting section 13.

Next description is made for the index selecting section 12 with reference to FIG. 3. In FIG. 3, a signal "+SEL I1 INDEX" indicates that an index number is used as a result of decoding the operand code OP1 and also that the index number is not zero. Namely, this signal indicates that the first instruction really uses an index number. When this signal is valid, the control unit 1 sends out the index number for the first instruction to the register file 2. A signal "+SEL I2 INDEX" indicates that the first instruction does not use any index number and also that the second instruction uses an index number. Namely, when this signal is valid, the control unit 1 sends out the index 10 number for the second instruction to the register file 2.

The index selecting section 12 shown in FIG. 3 comprises NAND circuits 122, 124, and AND circuits 121, 123, 125, 126, and 127. The AND circuit 121 computes a logical product of the signal (a) "+I1 USE INDEX" and an inverted signal of the signal (d) "+I1 INDEX EQ 0", and outputs a result of the operation to the register file 2 as a signal "+SEL I1 INDEX" for selecting an index for the first instruction. The NAND circuit 122 computes a logical product of the signal (a) "+I1 USE INDEX" and an inverted signal of the signal (d) "+I1 INDEX EQ 0", inverts a result of the operation, and outputs the inverted result to the AND circuits 126 and 127.

The AND circuit 123 computes a logical product of the signal (b) "+I2 USE INDEX" and an inverted signal of the signal (e) "+I2 INDEX EQ 0", and outputs a result of the operation to the AND circuit 126 as a signal ("+SEL I2 INDEX") for selecting an index for the second instruction. The NAND circuit 124 computes a logical product of the signal (b) "+I2 USE INDEX" and an inverted signal of the signal (e) "+I2 INDEX EQ 0", inverts result of the operation, and outputs the inverted result to the AND circuit 127.

The AND circuit 125 computes a logical product of the signal (c) "+I3 USE INDEX" and an inverted signal of the signal (f) "+I3 INDEX EQ 0", and outputs a result of the operation to the AND circuit 127 as a signal ("+SEL I3 INDEX") for selecting an index for the third instruction.

The AND circuit 126 sends out a signal "+SEL I2 INDEX" for selecting an index for the second instruction to the register file 2 according to a logical product of a signal "+SEL I1 INDEXP" from the NAND circuit 122 and a signal "+SEL, I2 INDEX" from the AND circuit 123.

The AND circuit 127 sends out a signal "+SEL I3 INDEX" for selecting an index for the third instruction to the register file 2 according to a logical product of a signal "+SEL I1 INDEXP" from the NAND circuit 122, an inverted signal from the NAND circuit 124 and a signal "+SEL I3 INDEX" from the AND circuit 125.

Next description is made for the dispatch inhibiting section 13 with reference to FIG. 4. In FIG. 4, a signal "+INH EX2" is "1" when all conditions are satisfied that an index number for the first instruction is selected, the second instruction uses an index number and index numbers for the first and second instructions are not equal to each other. In this case, the second instruction inhibits what is executed in the executing unit 4B, and for this reason, setting of the executing-unit activating register 3B is inhibited.

Also, a signal "+INH EX3" is "1" (valid) in cases as follows and is sent out. Namely, one of the cases is effected when all conditions are satisfied that an index number for the first instruction is selected, the third instruction uses an index number, an index number for the third instruction is used and index numbers for the first and third instructions are not equal to each other. The other one of the cases is effected when all conditions are satisfied that an index for the first instruction is selected but the index number is zero or an index number for the first instruction is not used and the index number may be zero or any other value, an index number for the second instruction is selected, the third instruction uses an index number, and index numbers for the second and third instructions are not equal to each other.

The dispatch inhibiting section 13 shown in FIG. 4 comprises NOR circuits 131 and 132, a NOT circuit 133, AND circuits 134, 135 and 136, and an OR circuit 137. The NOR circuit 131 inverts a logical sum of the signal (e) "+I2 INDEX EQ 0" and the signal (g) "+I1 INDEX EQ I2 INDEX", and outputs the inverted OR to the AND circuit 134. The NOR circuit 132 inverts a logical sum of the signal (f) "+I3 INDEX EQ 0" and the signal (h) "+I1 INDEX EQ I3 INDEX", and outputs the inverted OR to the AND circuit 135. The NOT circuit 133 inverts the signal (i) "+I2 INDEX EQ I3 INDEX" and outputs the inverted signal to the AND circuit 136.

The AND circuit 134 issues a control signal for inhibiting dispatch for the second instruction, namely a signal "+INH EX2" to the executing-unit activating register 3B (which corresponds to the executing unit 4B) according to a logical product of the inverted signal from the NOR circuit 131 and the signal "+SEL I1 INDEX" as well as signal (b) "+I2 USE INDEX" from the AND circuit 121.

The AND circuit 135 outputs a control signal for inhibiting dispatch for the third instruction, namely a signal "+INH EX3" to the OR circuit 137 according to a logical product of the inverted signal from the NOR circuit 132 and the signal "+SEL I1 INDEX" as well as signal (c) "+I3 USE INDEX" from the AND circuit 121.

The AND circuit 136 outputs the signal "+INH EX3" to the OR circuit 137 according to a logical product of the inverted signal (signal "+SEL I2 INDEXP") from the NAND circuit 122, the signal (c) "+I3 USE INDEX" and an output signal from the NOT circuit 133. The OR circuit 137 validates or invalidates the signal "+INH EX3" according to a logical add of the signal "+INH EX3" from the AND circuit 135 and the control signal from the AND circuit 136 and issues the signal to the executing-unit activating register 3C (which corresponds to the executing unit 4C).

When the signal "+INH EX3" is "1" as described above, the third instruction is inhibited to be executed in the executing unit 4C, so that setting of the executing-unit activating register 3C is inhibited.

Next detailed description is made for the operations including inhibition of dispatch with reference to FIG. 5 and FIG. 6. FIG. 5 is a view for explaining conditions under which a second instruction is allocated to any of executing units in a table form in Embodiment 1, and FIG. 6 is a view for explaining conditions under which a third instruction is allocated to any of the executing units in a table form in Embodiment 1. The conditions derived from the tables shown in FIG. 5 and FIG. 6 indicate a relation between input and output to/from the control unit 1.

At first, description is made for a case where the second instruction is allocated to the executing unit 4B with reference to FIG. 5. Conditions required for this case are largely divided according to whether the first instruction is using an index (which indicates a particular source operand in this case) or not. At first, when the first instruction is using the index (when the signal "+I1 USE INDEX" is "1" (valid)), the conditions are further divided according to whether the second instruction is using the same index as that used in the first instruction or not (when the signal "+I1 INDEX EQ I2 INDEX" is "1" (valid) or "0" (invalid)), or whether the second instruction does not use any index (when the signal "+I1 INDEX EQ 0" is "1" (valid)).

When the second instruction is using the same index as that for the first index, or when the second instruction does not use any index, allocation of the second instruction to the executing unit 4B is allowed. Namely, the output from the AND circuit 134 is "0" in the dispatch inhibiting section 13 shown in FIG. 4, and inhibition of the dispatch of the second instruction is invalidated. On the other hand, when the second instruction is using the index which is not the same as that for the first instruction, allocation of the second instruction to the executing unit 4B is not allowed. Namely, the output from the AND circuit 134 is "1" in the dispatch inhibiting section 13 shown in FIG. 4, and inhibition of the dispatch of the second instruction is validated.

Then, when the first instruction does not use any index, the conditions are divided according to whether the second instruction is using the index or not. In this case, allocation of the second instruction to the executing unit 4B is allowed regardless of whether the second instruction is using the same index as that for the first instruction or regardless of whether the second instruction is using any index or not. Namely, the output from the AND circuit 134 is "0" in the dispatch inhibiting section 13 shown in FIG. 4, and inhibition of the dispatch of the second instruction is invalidated.

Further description is made for a case where the third instruction is allocated to the executing unit 4C with reference to FIG. 6. Conditions in this case are largely divided, similarly to the case in FIG. 5, according to whether the first instruction is using an index (which indicates a particular source operand in this case) or not. At first, when the first instruction is using the index, the conditions are further divided, regardless of whether the second instruction is using the same index or not, according to whether the third instruction is using the same index as that for the first instruction or not, or whether the third instruction does not use any index. Herein, the output from the AND circuit 135 for the dispatch inhibiting section 13 is the key for the division.

When the third instruction is using the same index as that for the first instruction, or when the third instruction does not use any index, allocation of the third instruction to the executing unit 4C is allowed. Namely, the output from the OR circuit 137 is "0" according to "0" which is the output from the AND circuits 135 and 136 in the dispatch inhibiting section 13 in FIG. 4, and inhibition of the dispatch of the third instruction is invalidated. On the other hand, when the third instruction is using an index which is not the same as that from the first instruction, allocation of the third instruction to the executing unit 4C is not allowed. Namely, the output from the OR circuit 137 is "1" according to "1" which is the output from the AND circuit 135 in the dispatch inhibiting section 13 in FIG. 4, and inhibition of the dispatch of the third instruction is validated.

Further, when the first instruction does not use any index, the conditions are divided according to whether the second instruction is using an index (which indicates a particular source operand in this case) or does not use any index. Herein, the output from the AND circuit 136 for the dispatch inhibiting section 13 is the key for the division. When the second instruction is using an index, the conditions are divided according to whether the third instruction is using the same index as that for the second instruction or does not use any index.

When the third instruction is using the same index as that for the second instruction, or when the third instruction does not use any index, allocation of the third instruction to the executing unit 4C is allowed. Namely, the output from the OR circuit 137 is "0" according to the output of "0" from the AND circuits 135 and 136 in the dispatch inhibiting section 13 in FIG. 4, and inhibition of the dispatch of the third instruction is invalidated. On the other hand, when the third instruction is using an index which is not the same as that from the second instruction, allocation of the third instruction to the executing unit 4C is not allowed. Namely, the output from the OR circuit 137 is "1" according to "1" which is the output from the AND circuit 136 in the dispatch inhibiting section 13 in FIG. 4, and inhibition of the dispatch of the third instruction is validated.

Then, when the second instruction does not use any index, the conditions are divided according to whether the third instruction is using an index or does not use any index. In this case, allocation of the third instruction to the executing unit 4C is allowed regardless of whether the third instruction is using the same index as that for the second instruction or regardless of whether the third instruction is using an index or not. Namely, the output from the OR circuit 137 is "0" according to the output of "0" from the AND circuits 135 and 136 in the dispatch inhibiting section 13 shown in FIG. 4, and inhibition of the dispatch of the third instruction is invalidated.

As described above, with Embodiment 1, in the control unit 1, a plurality of instructions to simultaneously be executed are decoded, an executing unit to be dispatched of a plurality of executing units is selected according to a result of decoding, and dispatch to any of the plurality of executing units is inhibited according to a result of the decoding as well as to a result of the selection. With those operations, the processing for instructions can rapidly be executed by simultaneously decoding and executing a plurality of instructions, and the rapid execution can be realized with a minimum amount of hardware without extensive provision of data paths for reading registers therein.

Also, when a first instruction is using a particular source operand and if a following second instruction uses a different source operand, dispatch to an executing unit correlating to the second instruction is inhibited. With those operations, for preferential execution of the first instruction among a plurality of instructions, if a following instruction (second instruction) can share the particular source operand, simultaneous execution thereof is allowed and the simultaneous processing of a plurality of instructions is realized, and on the other hand, if the following instruction (second instruction) can not share the particular source operand, the instruction can be excluded from the simultaneous processing.

Further, when a first instruction is using a particular source operand and if a third instruction, which is by two pieces of instruction behind the first instruction, uses a different source operand, dispatch to an executing unit correlating to the third instruction is inhibited, and when the first instruction does not use any source operand and a second instruction is using a particular source operand, and if the following third instruction uses a different source operand, dispatch to an executing unit correlating to the third instruction is inhibited. With those operations, for preferential execution of the first instruction or the second instruction among a plurality of instructions, if a following instruction can share the particular source operand, simultaneous execution thereof is allowed and the simultaneous processing of a plurality of instructions is realized, and on the other hand, if the following instruction can not share the particular source operand, the instruction can be excluded from the simultaneous processing.

In Embodiment 1, an operand code and an index number are read out from each of the instruction registers 9A, 913 and 9C, and are decoded in the control unit 1, but, like Embodiment 2 described below, the decoding processing may be discretely provided by being separated from the processing executed in the control unit. In Embodiment 2 described below, the same reference numerals are assigned to the sections corresponding to those in Embodiment 1, and description of the sections and operations is omitted herein.

Figure 7:
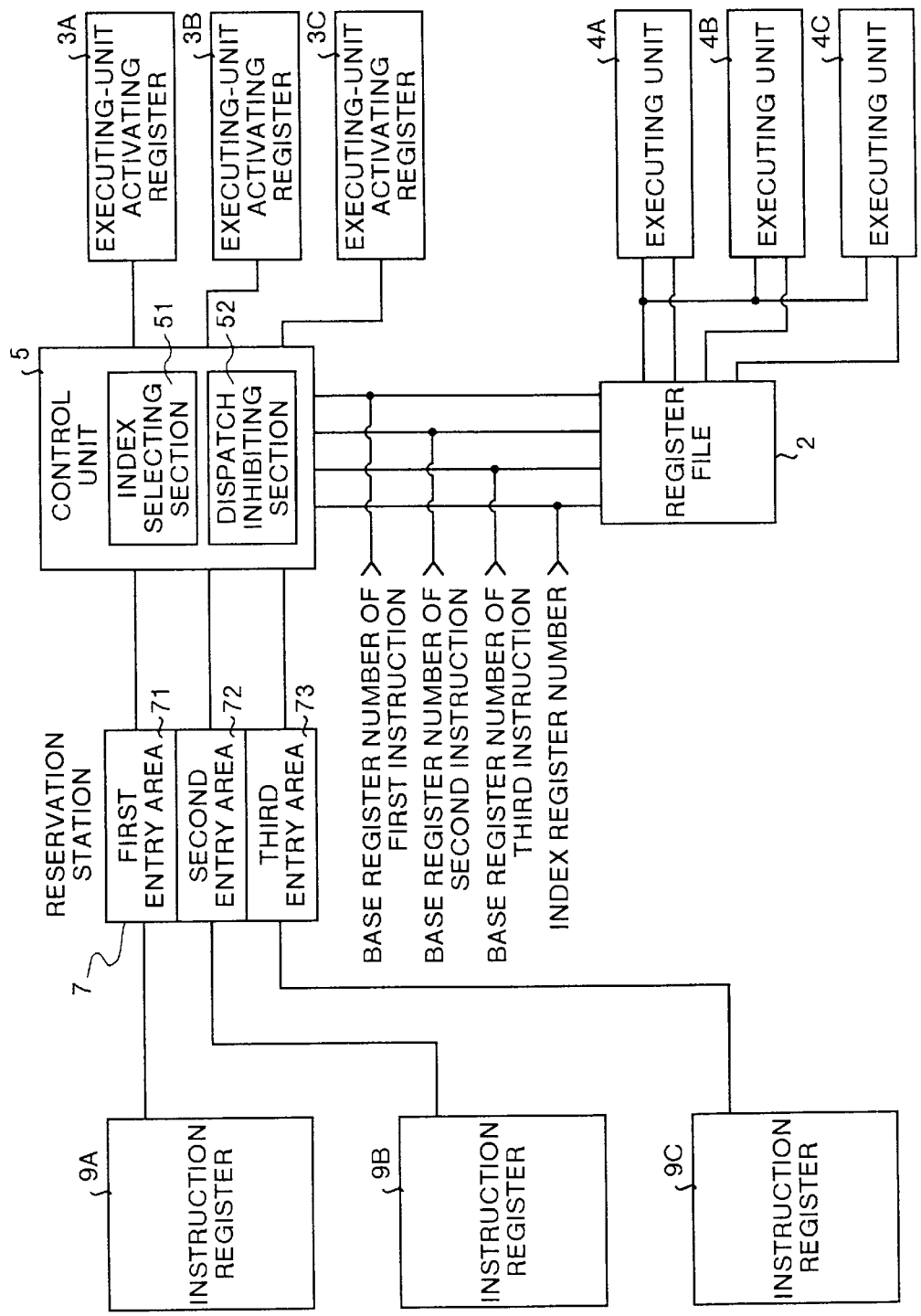
FIG. 7 is a block diagram showing configuration of an information processor according to Embodiment 2 of the present invention.

At first, description is made for the operations. FIG. 7 is a block diagram showing configuration of an information processor according to Embodiment 2 of the present invention. This information processor comprises, as shown in FIG. 7, a register file 2, executing-unit activating registers 3A, 3B and 3C, executing units 4A, 4B and 4C, a control unit 5, a reservation station 7, and instruction registers 9A, 9B and 9C.

Different from the configuration in Embodiment 1 are the control unit 5 and reservation station 7 which correspond to the control unit 1 described above. The control unit 5 has such configuration that the section corresponding to the decoder section 11 is omitted from the control unit 1. Accordingly, the control unit 5 comprises an index selecting section 51 corresponding to the index selecting section 12 and a dispatch inhibiting section 52 corresponding to the dispatch inhibiting section 13.

Also, the reservation station 7 comprises a first entry area 71, a second entry area 72 and a third entry area 73 correlating to the instruction registers 9A, 9B and 9C respectively each for decoding an instruction and storing therein an entry as a result of decoding. Each data maintained in each of the instruction registers 9A, 9B and 9C is stored in each of the first entry area 71, second entry area 72 and the third entry area 73 respectively.

Figures 8, 9:
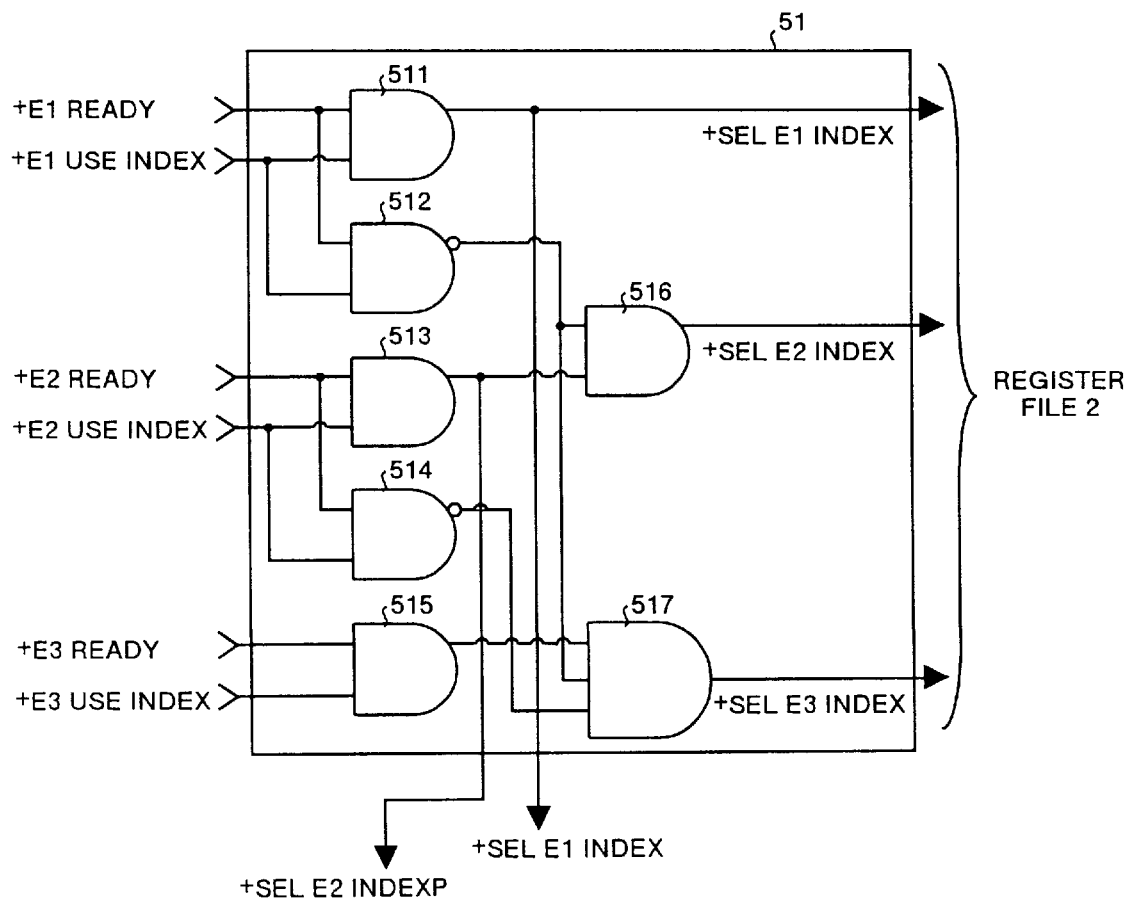
FIG. 8 is a view showing one example of entry contents according to Embodiment 2 of the present invention.
FIG. 9 is a block diagram showing configuration of an index selecting section for the control unit shown in FIG. 7.

Next description is made for entry contents of the reservation station 7. FIG. 8 is a view showing one example of entry contents according to Embodiment 2 of the present invention. The entry contents comprises, as shown in FIG. 8, data V1 indicating that an index number DTn-1 (n indicates an instruction number, n=1, 2 or 3) is used, data R1 indicating that the index number DTn-1 is usable, a register address A1 for the index number DTn-1, data V2 indicating that an index number DTn-2 is used, data R2 indicating that the index number DTn-2 is usable, and a register address A2 for the index number DTn-2.

Stored, for example, in the first entry area 71 are data V1 indicating that an index number DT1-1 is used, data R1 indicating that the index number DT1-1 is usable, a register address A1 for the index number DT1-1, data V2 indicating that an index number DT1-2 is used, data R2 indicating that the index number DT1-2 is usable, and a register address A2 for the index number DT1-2. Each data is stored in the second entry area 72 as well as in the third entry area 73 under the same rules.

Figure 10:
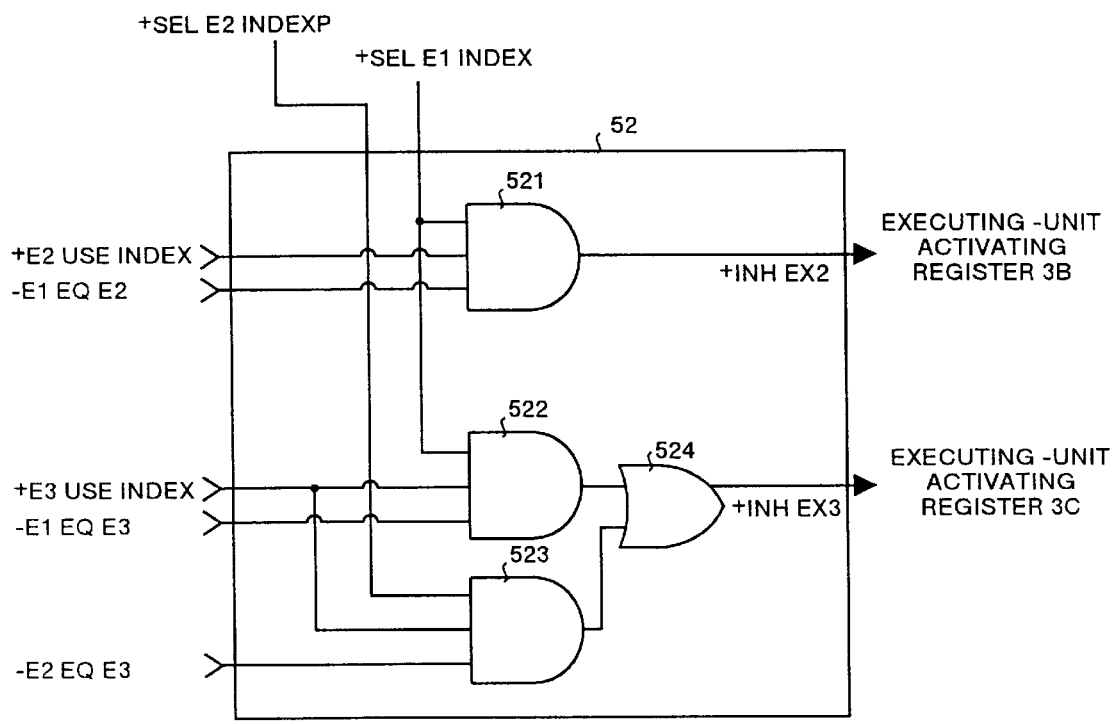
FIG. 10 is a block diagram showing configuration of a dispatch inhibiting section for the control unit shown in FIG. 7.

Next description is made for the control unit 5. FIG. 9 is a block diagram showing configuration of the index selecting section 51 for the control unit 5, and FIG. 10 is a block diagram showing configuration of the dispatch inhibiting section 52 for the control unit 5.

At first, description is made for the index selecting section 51 with reference to FIG. 9. In FIG. 9, a signal "+E1 READY" is "1" when an instruction from the first entry area 71 is executable. This signal is generated from V bit and R bit, and is generated when each register operand is not used or usable by a logical product obtained under the condition. A signal "+SEL E1 INDEX" is "1" when an index number for the first entry area 71 is selected.

Also, a signal "+E2 READY" is "1" when an instruction from the second entry area 72 is executable. This signal is generated from V bit and R bit, and is generated when each register operand is not used or usable by a logical product obtained under the condition. A signal "+SEL E2 INDEX" is "1" when an index number for the second entry area 72 is selected.

Also, a signal "+E3 READY" is "1" when an instruction in the third entry area 73 is executable. This signal is generated from V bit and Rbit, and is generated when each register operand is not used or usable by a logical product obtained under the condition. A signal "+SEL E3 INDEX" is "1" when an index number for the third entry area 73 is selected.

The index selecting section 51 comprises, as shown in FIG. 9, AND circuits 511, 513, 515, 516 and 517, and NAND circuits 512 and 514. The AND circuit 511 sends out a signal "+SEL E1 INDEX" for selecting an index for a first instruction according to a logical product of the signal "+E1 READY" and the signal "+E1 USE INDEX" to the register file 2. Also, this signal "+SEL E1 INDEX" is also sent out to the AND circuits 521 and 522 for the dispatch inhibiting section 52.

The NAND circuit 512 inverts a result of operation obtained by a logical product of the signal "+E1 READY"

and the signal "+E1 USE INDEX", and outputs the inverted result to the AND circuit 516 and the AND circuit 517.

The AND circuit 513 sends out a signal "+SEL E2 INDEXP" for selecting an index for a second instruction according to a logical product of the signal "+E2 READY" and the signal "+E2 USE INDEX" to the AND circuit 516. Also, this signal "+SEL E2 INDEXP" is also sent out to the AND circuits 523 for the dispatch inhibiting section 52.

The NAND circuit 514 inverts a result of operation obtained by a logical product of the signal "+E2 READY" and the signal "+E2 USE INDEX", and outputs the inverted result to the AND circuit 517. The AND circuit 515 sends out a signal "+SEL E3 INDEX" for selecting an index for a third instruction to the AND circuit 517 according to a logical product of the signal "+E3 READY" and the signal "+E3 USE INDEX".

The AND circuit 516 sends out the signal "+SEL E2 INDEX" to the register file 2 according to a logical product of the inverted signal from the NAND circuit 512 and an output from the AND circuit 513. The AND circuit 517 sends out the signal "+SEL E3 INDEX" to the register file 2 according to a logical product of an output from the AND circuit 515, the inverted signal from the NAND circuit 512 and the inverted signal from the NAND circuit 514.

Next description is made for the dispatch inhibiting section 52 with reference to FIG. 10. In FIG. 10, a signal "+INH EX2" is a control signal for inhibiting setting of the executing-unit activating register 3B when an instruction from the second entry area 72 is issued to the executing unit 4B. A signal "+INH EX3" is a control signal for inhibiting setting of the executing-unit activating register 3C when an instruction from the third entry area 73 is issued to the executing unit 4C. A signal "−E1 EQ E3" is "1" when register addresses for the first entry area 71 and the third entry area 73 do not coincide with each other, and a signal "−E2 EQ E3" is "1" when register addresses for the second entry area 72 and the third entry area 73 do not coincide with each other.

The dispatch inhibiting section 52 comprises, as shown in FIG. 10, AND circuits 521, 522 and 523, and an OR circuit 524. The AND circuit 521 sends out the signal "+INH EX2" to the executing-unit activating register 3B according to a logical product of the signal "+SEL E1 INDEX" from the AND circuit 511, the signal "+E2 USE INDEX" and the signal "−E1 EQ E2".

Namely, when entry contents of the first entry area 71 is selected (when the output from the AND circuit 511 is "1" (valid)), and if an index number for the second entry area 72 is used (when the signal "+E2 USE INDEX" is "1" (valid)), and also if the entry contents for the first entry area 71 and the second entry area 72 do not coincide with each other (when the signal "−E1 EQ E2" is "1"), a control signal (when the signal "+INH EX2" is "1" (valid)) for inhibiting the setting is issued to the executing-unit activating register 3B.

The AND circuit 522 sends out the signal "+INH EX3" to the OR circuit 524 according to a logical product of the signal "+SEL E1 INDEX" from the AND circuit 511, the signal "+E3 USE INDEX" and the signal "−E1 EQ E3". The AND circuit 523 also sends out the signal "+INH EX3" to the OR circuit 524 according to a logical product of an output from the AND circuit 513 (signal "+SEL E2 INDEXP"), the signal "+E3 USE INDEX" and the signal "−E2 EQ E3".

The OR circuit 524 sends out the signal "+INH EX3" to the executing-unit activating register 3C according to a logical sum of an output from the AND circuit 522 and an output from the AND circuit 523. Namely, when entry contents of the first entry area 71 is selected (when the output from the AND circuit 511 is "1" (valid)), and if an index number for the third entry area 73 is used (when the signal "+E3 USE INDEX" is "1" (valid) and also if the entry contents for the first entry area 71 and the third entry area 73 do not coincide with each other (when the signal "−E1 EQ E2" is "1" (valid)), a control signal (when the signal "+INH EX3" is "1" (valid)) for inhibiting the setting is issued to the executing-unit activating register 3C.

When an instruction in the second entry area 72 is executable and the index number for the instruction is usable (when the output from the AND circuit 513 is "1" (valid)), and if an index number for the third entry area 73 is usable (when the signal "+E3 USE INDEX" is "1" (valid)) and also if the entry contents of the second entry area 72 and third entry area 73 do not coincide with each other (when the signal "−E2 EQ E3" is "1" (valid) the control signal (when the signal "+INH EX3" is "1" (valid)) for inhibiting the setting is issued to the executing-unit activating register 3C.

Figure 11:
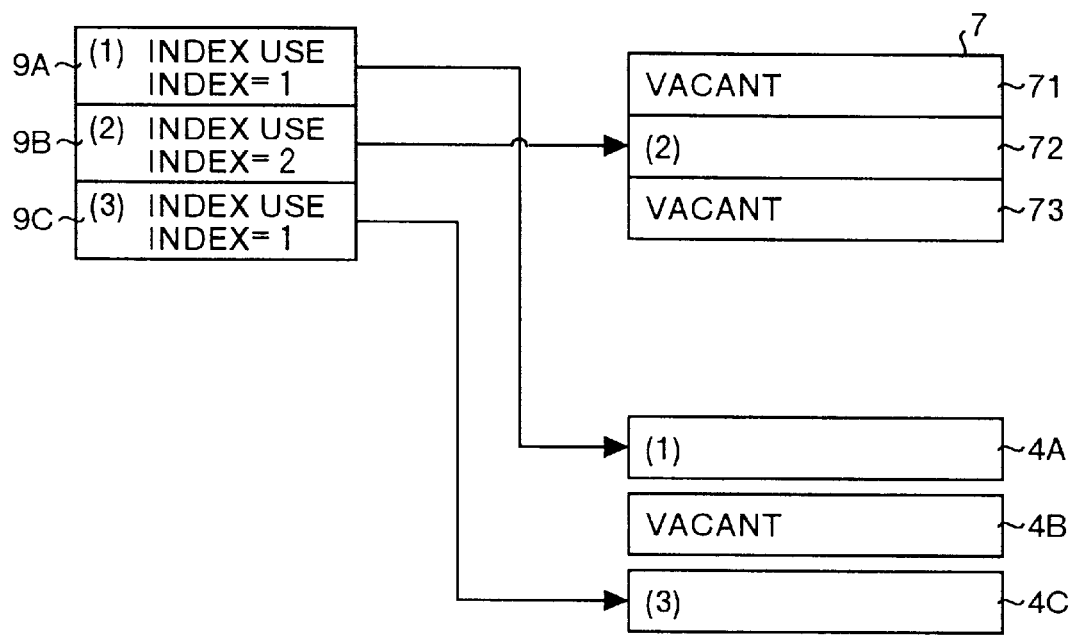
FIG. 11 is a view for explaining a data flow according to Embodiment 2.

Next description is made for the operations different from those in Embodiment 1 with reference to FIG. 8 to FIG. 11. FIG. 11 is a view for explaining a data flow according to Embodiment 2. Stored in the instruction registers 9A, 9B and 9C are instructions each for using an index respectively, and index numbers each used for the instruction are data "INDEX=1", data "INDEX=2", and data "INDEX =1".

In this case, control for activating the executing units 4A, 4C is provided according to the first instruction and the third instruction stored in the instruction registers 9A and 9C respectively. On the other hand, the second instruction stored in the instruction register 9B is, at first, loaded in the second entry area 72 for the reservation station 7, and then waiting for a next timing is effected. Accordingly, the executing unit 4B at that point of time is vacant.

In the example shown in FIG. 11, as described above, instruction index numbers are used together with the first instruction, second instruction, and the third instruction at the time of decoding instructions, and in a cycle following the cycle for decoding an instruction in which the index number for the first instruction is equal to the index number for the third instruction, the first instruction is executed in the executing unit 4A, and the third instruction is executed in the executing unit 4C, while the second instruction is stored in the entry register 72 for the reservation station 7.

As described above, with Embodiment 2, in addition to the same effect as that in Embodiment 1, after decoding a plurality of instructions to simultaneously be executed, in the control unit 5, any executing unit to be dispatched of a plurality of executing units 4A, 4B, and 4C is selected according to a result of decoding, and also dispatch to any of the plurality of executing units 4A, 4B and 4C is inhibited according to a result of the decoding as well as to a result of the selection. With those operations, the processing for instructions can rapidly be executed by simultaneously decoding and executing a plurality of instructions, and the rapid execution can be realized with a minimum amount of hardware without extensive provision of data paths for reading registers therein.

Also, each source operand of instructions not dispatched to each of executing units is stored in the reservation station 7 under control by the control unit 5, so that any instruction to be executed next can be stored in the instruction register 9.

In the present invention, a control unit may have, like Embodiment 3 described below, both of the characteristics of Embodiments 1 and 2. In Embodiment 3 described below, the same reference numerals are assigned to the sections corresponding to those in Embodiments 1 and 2, and description thereof is omitted herein.

Figure 12:
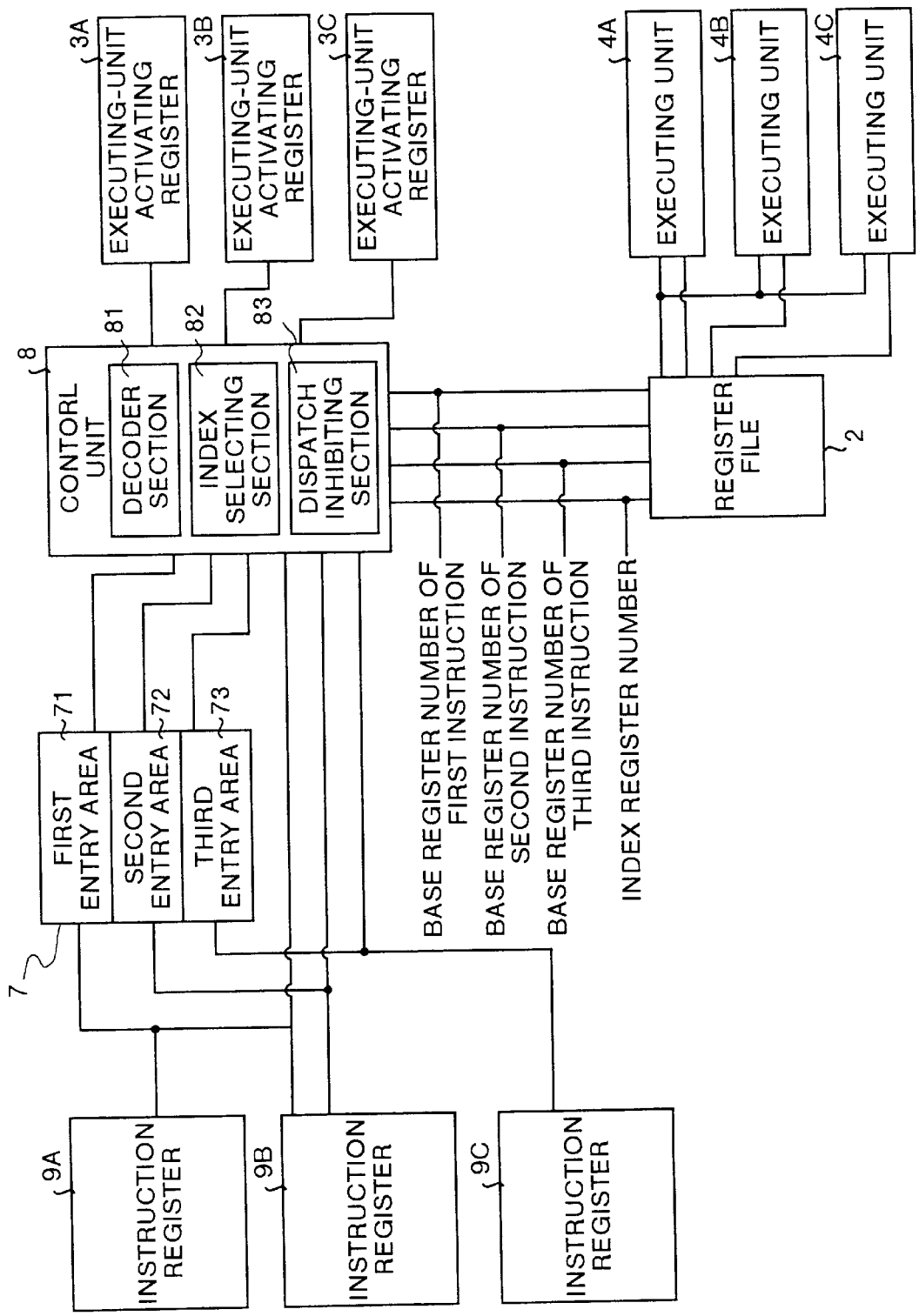
FIG. 12 is a block diagram showing configuration of an information processor according to Embodiment 3 of the present invention.

At first, description is made for the operations. FIG. 12 is a block diagram showing configuration of an information processor according to Embodiment 3 of the present invention. This information processor comprises, as shown in FIG. 12, a register file 2, executing-unit activating registers 3A, 3B and 3C, executing units 4A, 4B and 4C, a control unit 8, a reservation station 7, and instruction registers 9A, 9B and 9C.

In this Embodiment 3, the control unit 8 comprising an index selecting section 82 and a dispatch inhibiting section 83 is employed in place of the control unit 5 in Embodiment 2 described above.

Figure 13:
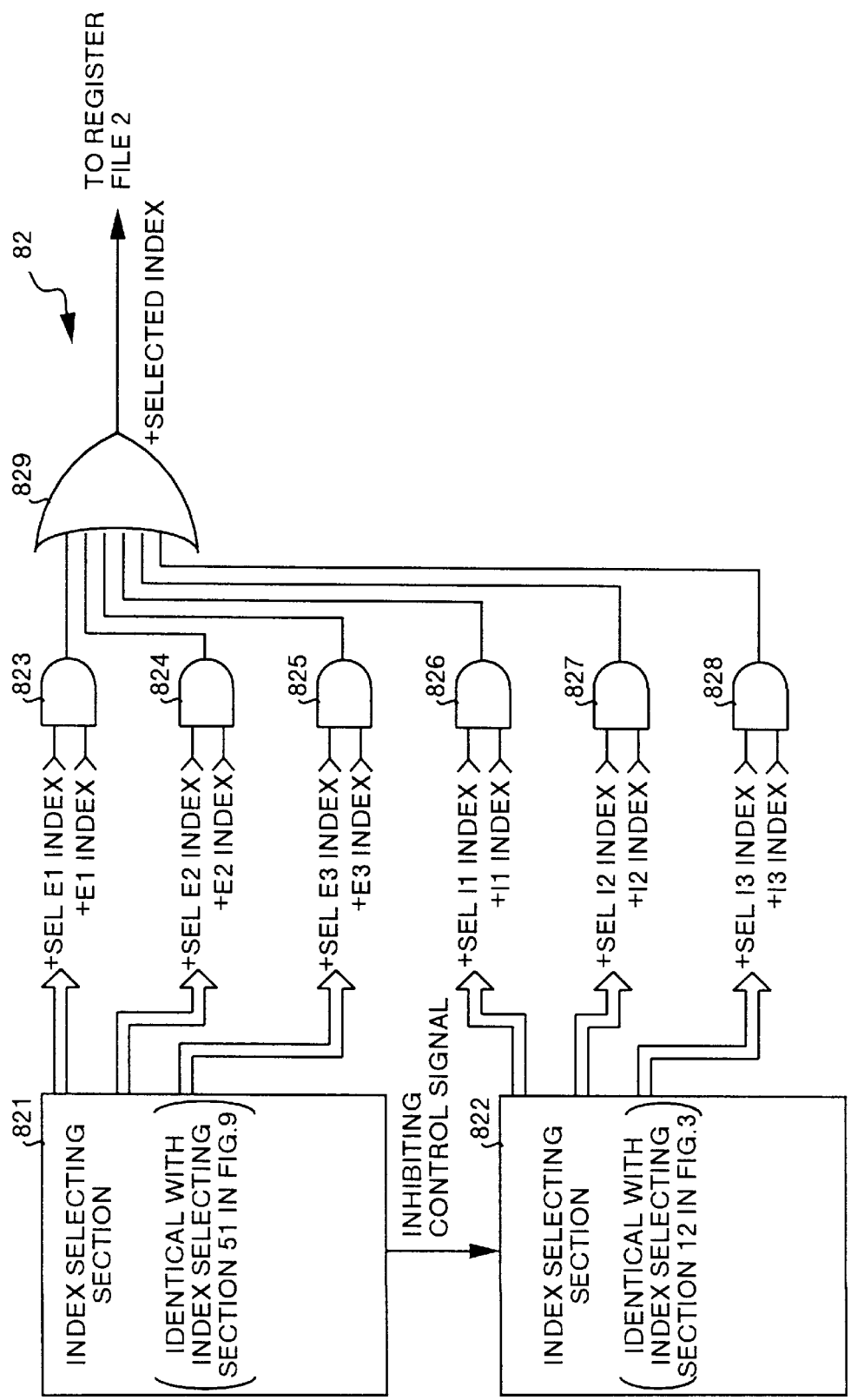
FIG. 13 is a block diagram showing configuration of an index selecting section for the control unit shown in FIG. 12.
Figure 14:
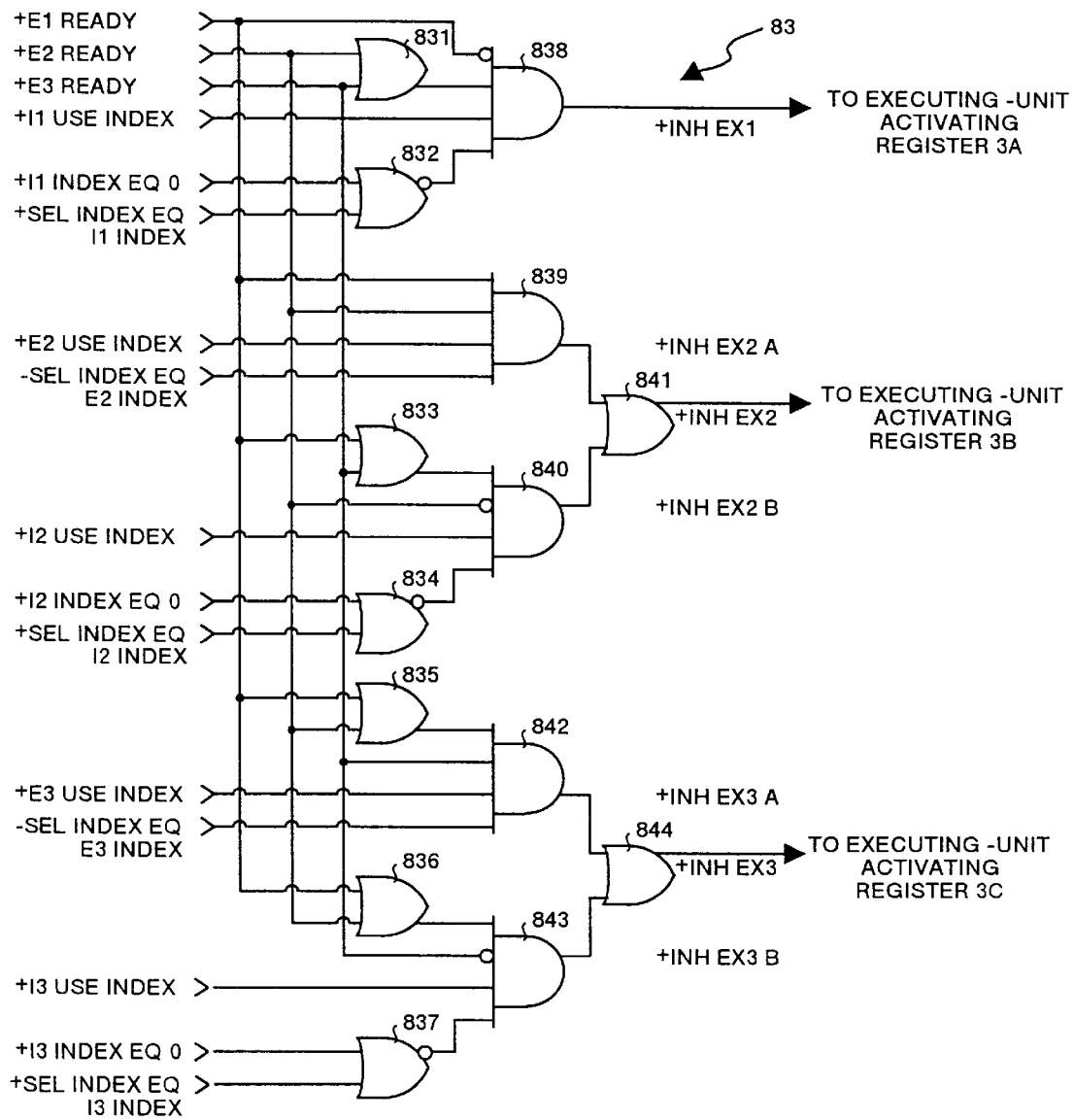
FIG. 14 is a block diagram showing configuration of a dispatch inhibiting section for the control unit shown in FIG. 12.

Next detailed description is made for the control unit 8 with reference to FIG. 13 and FIG. 14. FIG. 13 is a block diagram showing configuration of the index selecting section 82 for the control unit 8, and FIG. 14 is a block diagram showing configuration of the dispatch inhibiting section 83 for the control unit 8.

At first, description is made for the index selecting section 82 with reference to FIG. 13. The index selecting section 82 comprises, as shown in FIG. 13, an index selecting section 821 corresponding to the index selecting section 51 in FIG. 9 (Embodiment 2), an index selecting section 822 corresponding to the index selecting section 12 in FIG. 3 (Embodiment 1), AND circuits 823 to 828, and an OR circuit 829.

The AND circuit 823 computes a logical product of a signal "+SEL E1 INDEX" (a signal for selecting an index number for the first entry area 71) and a signal "+E1 INDEX" (an index number used by the first entry area 71) each outputted from the index selecting section 821. The AND circuit 824 computes a logical product of a signal "+SEL E2 INDEX" (a signal for selecting an index number for the second entry area 72) and a signal "+E2 INDEX" (an index number used by the second entry area 72) each outputted from the index selecting section 821. The AND circuit 825 computes a logical product of a signal "+SEL E3 INDEX" (a signal for selecting an index number for the third entry area 73) and a signal "+E3 INDEX" (an index number used by the third entry area 73) each outputted from the index selecting section 821.

The AND circuit 826 computes a logical product of a signal "+SEL I1 INDEX" (a signal for selecting an index number for the instruction register 9A) and a signal "+I1 INDEX" (an index number used by the instruction register 9A) each outputted from the index selecting section 822. The AND circuit 827 computes a logical product of a signal "+SEL I2 INDEX" (a signal for selecting an index number for the instruction register 9B) and a signal "+I2 INDEX" (an index number used by the instruction register 9B) each outputted from the index selecting section 822. The AND circuit 828 computes a logical product of a signal "+SEL I3 INDEX" (a signal for selecting an index number for the instruction register 9C) and a signal "+I3 INDEX" (an index number used by the instruction register 9C) each outputted from the index selecting section 822.

The OR circuit 829 sends out a signal "SELECTED INDEX" indicating an index to finally be selected according to a logical sum of all output from the AND circuits 823 to 828. Accordingly, the OR circuit 829 sends out the signal as an index number to select any one of valid output from the AND circuits 823 to 828.

In order to realize the present invention according to Embodiment 3, it is necessary to give the preference to either one of the index selecting sections 821 (corresponding to the index selecting section 51) and 822 (corresponding to the index selecting section 12), but this matter can be solved by inhibiting, when an index number is selected from any of entries, either one of the index selecting sections.

Next description is made for the dispatch inhibiting section 83 with reference to FIG. 14. In FIG. 14, a signal "+INH –EX1" is a control signal for inhibiting setting of the executing-unit activating register 3A when a first instruction is issued to the executing unit 4A. When any executable entry is present in either the second entry area 72 or the third entry area 73 (when the signal "+E2 READY" is "1" (valid), and when the signal "+E3 READY" is "1" (valid) and if there is no executable instruction in the first entry area 71 (when the signal "+E1 READY" is "0" (invalid)), the first instruction from the instruction register 1 is dispatched to the executing unit 4A. However, when the first instruction is using an index number, and if the signal "+SELECTED INDEX" is not equal to the index number for the first instruction, setting to the executing-unit activating register 3A is inhibited with the signal "+INH EX1".

A signal "+INH EX2" is computed according to a logical sum of a signal "+INH EX2 A" and a signal "+INH EX2 B". The signal "+INH EX2" is a control signal, similar to the signal "+INH EX1 B", for inhibiting dispatch from the instruction register 9B. The signal "+INH EX2 A" is a control signal used for checking whether dispatch from the second entry area 72 to the executing unit 4B cane effected or not when the first entry area 71 is executed, and for inhibiting, when the dispatch can not be effected, the setting to the executing-unit activating register 3B.

A signal "+INH EX3" is computed according to a logical sum of a signal "+INH EX3 A" and a signal "+INH EX3 B". The signal "+INH EX3 B" is a control signal, similar to the signal "+INH EX1", for inhibiting dispatch from the instruction register 9C. The signal "+INH EX3 A" is a control signal used for checking whether dispatch from the third entry area 73 to the executing unit 4C can be effected or not when the first entry area 71 or the second entry area 72 is executed, and for inhibiting, when the dispatch can not be effected, the setting to the executing-unit activating register 3C.

A signal "+SEL INDEX EQ I1 INDEX" is "1" when a selected index number is equal to an index number for the instruction register 9A. A signal "–SEL INDEX EQ E2 INDEX" is "1" when a selected index number is equal to an index number for the second entry area 72.

A signal "+SEL INDEX EQ I2 INDEX" is "1" when a selected index number is equal to an index number for the instruction register 9B. A signal "+SEL INDEX EQ I3 INDEX" is "1" when a selected index number is equal to an index number for the instruction register 9C. A signal "–SEL INDEX EQ E3 INDEX" is "1" when a selected index number is equal to an index number for the third entry area 73.

The dispatch inhibiting section 83 comprises, as shown in FIG. 14, OR circuits 831, 833, 835, 836, 841 and 844, NOR circuits 832, 834 and 837, NAND circuits 838, 840 and 843, and AND circuits 839 and 842.

The OR circuit 831 computes a logical sum of the signal "+E2 READY" and the signal "+E3 READY" and outputs a result of the operation to the NAND circuit 838. The NOR circuit 832 inverts a logical sum of the signal "+I1 INDEX EQ 0" and the signal "+SEL INDEX EQ I1 INDEX" and outputs the inverted signal to the NAND circuit 838.

The OR circuit 833 computes a logical sum of the signal "+E1 READY" and the signal "+E3 READY" and outputs a result of the operation to the NAND circuit 840. The NOR circuit 834 inverts a logical sum of the signal "+I2 INDEX EQ 0" and the signal "+SEL INDEX EQ I2 INDEX" and outputs the inverted signal to the NAND circuit 840.

The OR circuit 835 computes a logical sum of the signal "+E1 READY" and the signal "+E2 READY" and outputs a result of the operation to the AND circuit 842.

The OR circuit 836 computes a logical sum of the signal "+E1 READY" and the signal "+E2 READY" and outputs a result of the operation to the NAND circuit 843. The NOR circuit 837 inverts a logical sum of the signal "+I3 INDEX EQ 0" and the signal "+SEL INDEX EQ I3 INDEX" and outputs the inverted signal to the NAND circuit 843.

The NAND circuit 838 sends out the signal "+INH EX1" to the executing-unit activating register 3A according to a logical product of the inverted signal of the signal "+E1 READY", the output signal from the OR circuit 831, the signal "+I1 USE INDEX" and the output signal from the NOR circuit 832.

The AND circuit 839 sends out the signal "+INH EX2 A" to the OR circuit 841 according to a logical product of the signal "+E1 READY", signal "+E2 READY", signal "+E2 USE INDEX" and the signal "–SEL INDEX EQ E2 INDEX".

The NAND circuit 840 sends out the signal "+INH EX2 B" to the OR circuit 841 according to a logical product of the output signal from the OR circuit 833, the inverted signal of the signal "+E2 READY", the signal "+I2 USE INDEX" and the output signal from the NOR circuit 834.

The OR circuit 841 issues a control signal, namely the signal "+INH EX2" for finally inhibiting the setting to the executing-unit activating register 3B according to a logical sum of the output from the AND circuit 839, namely the signal "+INH EX2 A" and the outputfrom the NAND circuit 840, namely the signal "+INH EX2 B".

The AND circuit 842 outputs the signal "+INH EX3 A" to the OR circuit 844 according to a logical product of the output from the OR circuit 835, the signal "+E3 READY", the signal "+E3 USE INDEX" and the signal "–SEL INDEX EQ E3 INDEX".

The NAND circuit 843 outputs the signal "+INH EX3 B" to the OR circuit 844 according to a logical product of the output from the OR circuit 836, the inverted signal of the signal "+E3 READY", the signal "+I3 USE INDEX" and the output signal from the NOR circuit 837.

The OR circuit 844 issues a control signal, namely the signal "+INH EX3" for finally inhibiting the setting to the executing-unit activating register 3C according to a logical sum of the outputfrom the AND circuit 842, namely the signal "+INH EX3 A", and the output from the NAND circuit 843, namely the signal "+INH EX3 B".

Figure 15:
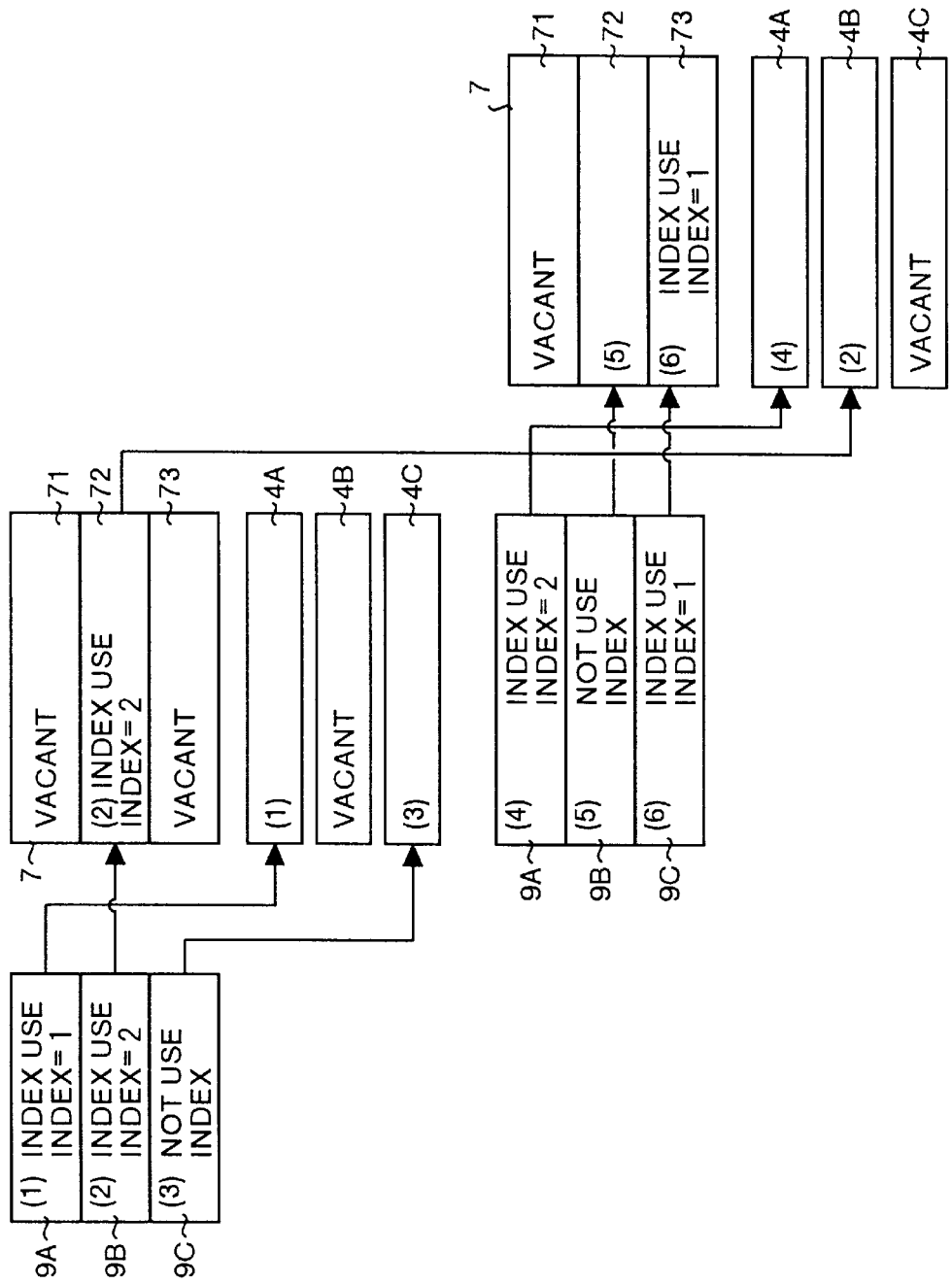
FIG. 15 is a view for explaining a data flow according to Embodiment 3.
Figure 16:
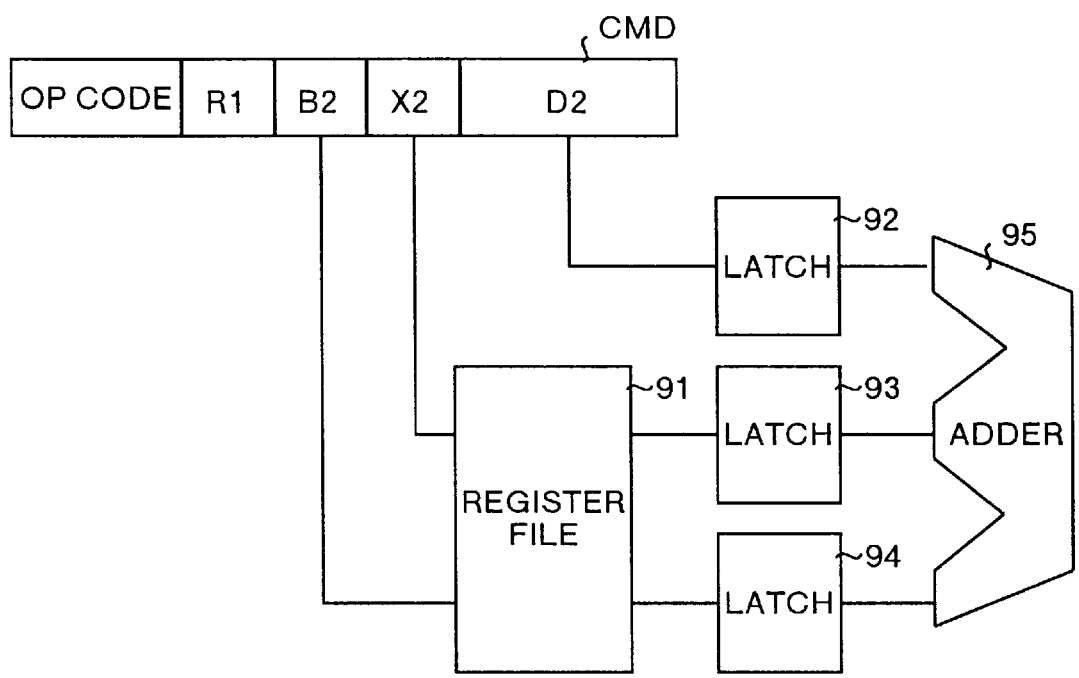
FIG. 16 is a simulated view for explaining principles of an information processor based on the conventional technology.

Next description is made for the operations different from those in Embodiment 2 with reference to FIG. 15. FIG. 15 is a view for explaining a data flow according to Embodiment 3. In the example in FIG. 15, the first instruction and the second instruction use index numbers in a first instruction decoding cycle, and the index numbers for both of the instructions are different from each other. At this point of time, the third instruction does not use any index number.

In the next cycle, the first instruction is executed in the executing unit 4A, the third instruction is executed in the executing unit 4C, while the second instruction is stored in the second entry area 72 for the reservation station 7. A following instruction string enters a decoding cycle at the same cycle. A fourth instruction uses an index number, which is equal to the index number in the second entry area 72. A fifth instruction can not be issued to the executing unit 4B because the instruction in the second entry area 72 is executable therein. The third instruction uses an index number, which is different from the index number in the second entry number area 72.

In the next cycle, the fourth instruction is executed in the executing unit 4A, the second instruction in the second entry area 72 is executed in the executing unit 4B, while the fifth instruction and a sixth instruction are stored in the second entry area 72 and the third entry area 73, respectively.

As described above, with Embodiment 3, in addition to the same effect as that in Embodiment 1 as well as in Embodiment 2, in the control unit 8, any executing unit to be dispatched of a plurality of executing units 4A, 4B, and 4C is selected according to a result of decoding a plurality of instructions to simultaneously the executed in the external reservation station 7 as well as a result of decoding the plurality of instructions inside the control unit 8, and also dispatch to any of the plurality of executing units 4A, 4B and 4C is inhibited according to a result of the decoding as well as to a result of the selection. With those operations, the processing for instructions can rapidly be executed by simultaneously decoding and executing a plurality of instructions, and the rapid execution can be realized with a minimum amount of hardware without extensive provision of data paths for reading register.

The description of the embodiments 1 to 3 assumes the case where three instructions are simultaneously executed, but the present invention is not limited to the case described above, and is applicable to a case where two instructions or more than four instructions are simultaneously executed.

Although the invention has been described with respect to specific embodiments for a clear and a complete disclosure, the appended claims are not to be thus limited but are to be construed as embodying all modifications and alternative constructions that may occur to one skilled in the art which fairly fall within the basic teaching herein set forth.

As described above, with the present invention, in a control unit, a plurality of instructions to simultaneously be executed are decoded, an executing unit to be dispatched of a plurality of executing units is selected according to a result of decoding, and dispatch to any of the plurality of executing units is inhibited according to a result of the decoding as well as to a result of the selection, so that it is possible to obtain an information processor in which the processing for instructions can rapidly be executed by simultaneously decoding and executing a plurality of instructions and the rapid execution can be realized with a minimum amount of hardware without extensive provision of data paths for reading registers therein.

With the present invention, a plurality of instructions to simultaneously be executed are decoded, and then in a control unit, an executing unit to be dispatched of a plurality of executing units is selected according to a result of decoding, and dispatch to any of the plurality of executing units is inhibited according to a result of the decoding as well as to a result of the selection, so that it is possible to obtain an information processor in which the processing for instructions can rapidly be executed by simultaneously decoding and executing a plurality of instructions and the rapid execution can be realized with a minimum amount of hardware without extensive provision of data paths for reading registers therein.

With the present invention, in a control unit, an executing unit to be dispatched of a plurality of executing units is selected according to a result of decoding a plurality of instructions to simultaneously be executed outside the unit as well as to a result of decoding the plurality of instructions inside the unit, and dispatch to any of the plurality of executing units is inhibited according to a result: of the decoding as well as to a result of the selection, so that it is possible to obtain an information processor in which the processing for instructions can rapidly be executed by simultaneously decoding and executing a plurality of instructions and the rapid execution can be realized with a minimum amount of hardware without extensive provision of data paths for reading registers therein.

With the present invention, a source operand for an instruction not dispatched to each of the executing units under control by the control unit is stored in a decoding/storing unit, so that it is possible to obtain an information processor in which a following instruction to be executed can be stored in a device outside the control unit.

With the present invention, when a first instruction is using a particular source operand and if a following second instruction uses a different source operand, dispatch to an executing unit correlating to the second instruction is inhibited, so that it is possible to obtain an information processor in which, for preferential execution of the first instruction among a plurality of instructions, if the following instruction (second instruction) can share the particular source operand, simultaneous execution thereof is allowed and the simultaneous processing of a plurality of instructions is realized, and on the other hand, if the following instruction (second instruction) can not share the particular source operand, the instruction can be excluded from the simultaneous processing.

With the present invention, when a first instruction is using a particular source operand and if a third instruction, which comes two pieces of instruction behind after the first instruction, uses a different source operand, dispatch to an executing unit correlating to the third instruction is inhibited, and when the first instruction does not: use any source operand and a second instruction is using a particular source operand, and if the following third instruction uses a different source operand, dispatch to an executing unit correlating to the third instruction is inhibited, so that it is possible to obtain an information processor in which, for preferential execution of the first instruction or the second instruction among a plurality of instructions, if a following instruction can share the particular source operand, simultaneous execution thereof is allowed and the simultaneous processing of a plurality of instructions is realized, and on the other hand, if the following instruction can not share the particular source operand, the instruction can be excluded from the simultaneous processing.

This application is based on Japanese patent application No. HEI 9-287081 filed in the Japanese Patent Office on Oct. 20, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processor comprising:
   a plurality of executing units each operating according to each of a plurality of instructions including a source operand to execute the instructions simultaneously;
   a controller controlling an operation of each of said executing units according to each of said instructions; and
   a register file outputting register contents specified by said controller to said plurality of executing units,
   wherein said controller comprises:
      a decoder receiving an instruction directed to each of said executing units and decoding the instruction;
      a selector selecting an executing unit to which an instruction is to be dispatched from said plurality of executing units according to a result of the decoding by said decoder and outputting information related to the selected executing unit to said register file; and
      a dispatch inhibiting unit inhibiting dispatch of an instruction to any of said plurality of executing units according to the decoded instructions by said decoder and the selected executing unit by said selector,
   wherein said dispatch inhibiting unit does not inhibit, when a header first instruction of said plurality of instructions is using a particular source operand, and if a following second instruction is using said particular source operand identical to that for said first instruction or does not use any source operand, dispatch of said second instruction according, to a result of decoding by said decoder as well as to a result of selection by said selector, but inhibits the dispatch of said second instruction in a case other than the cases described above, and in addition, said dispatch inhibiting unit does not inhibit the dispatch of said second instruction regardless of whether said second uses any source operand or not said first instruction does not use said particular source operand.

2. An information processor comprising:
   a plurality of executing units each operating according to each of a plurality of instructions including a source operand to execute the instructions simultaneously;
   a controller controlling an operation of each of said executing units according to each of said instructions; and
   a register file outputting register contents specified by said controller to said plurality of executing units,
   wherein said controller comprises:
      a decoder receiving an instruction directed to each of said executing units and decoding the instruction;
      a selector selecting an executing unit to which an instruction is to be dispatched from said plurality of executing units according to a result of the decoding by said decoder and outputting information related to the selected executing unit to said register file; and
      a dispatch inhibiting unit inhibiting dispatch of an instruction to any of said plurality of executing units according to the decoded instructions by said decoder and the selected executing unit by said selector,
   wherein said dispatch inhibiting unit does not depend on a following second instruction when a header first instruction of said plurality of instructions is using a particular source operand, and further does not inhibit, when a following third instruction is using said particular source operand identical to that for said first instruction or does not use any source operand, dispatch of said third instruction according to a result of decoding by said decoder as well as to a result of selection by said selector, but said dispatch inhibiting unit inhibits the dispatch of said third instruction in a case other than the cases described above, and in addition, does not inhibit the dispatch of said third instruction when said third instruction is using said particular source operand identical to that for said second instruction or does not use any source operand if said second instruction is using said particular source operand in a state where said first instruction does not use said particular source operand, and inhibits the dispatch of said third instruction in a case other than the cases described above, and on the other hand, if said second instruction does not use said particular source operand, said dispatch inhibiting unit does not inhibit the dispatch of said third instruction regardless of whether said third instruction uses any source operand or not.

3. An information processor comprising:

a plurality of executing units each operating according to each of a plurality of instructions including a source operand to execute the instructions simultaneously;

a decoding/storing unit decoding an input instruction directed to each of said executing units and storing therein the decoded instruction;

a controller controlling an operation of each of said executing units according to each of said instructions stored in said decoding/storing unit; and a register file outputting register contents specified by said controller to said plurality of executing units, wherein said controller comprises:

a selector selecting an executing unit to which an instruction is to be dispatched from said plurality of executing units according to an instruction stored in said decoding/storing unit and outputting the information concerning selection to said register file; and a dispatch inhibiting unit inhibiting dispatch of an instruction to any of said plurality of executing units according to the decoded instructions by said decoder and the selected executing unit by said selector, wherein said dispatch inhibiting unit does not inhibit, when a header first instruction of said plurality of instructions is using a particular source operand, and if a following second instruction is using said particular source operand identical to that for said first instruction or does not use any source operand, dispatch of said second instruction according to a result of decoding by said decoder as well as to a result of selection by said selector, but inhibits the dispatch of said second instruction in a case other than the cases described above, and in addition, said dispatch inhibiting unit does not inhibit the dispatch of said second instruction regardless of whether said second instruction uses any source operand or not when said first instruction does not use said particular source operand.

4. An information processor comprising:

a plurality of executing units each operating according to each of a plurality of instructions including a source operand to execute the instructions simultaneously;

a decoding/storing unit decoding an input instruction directed to each of said executing units and storing therein the decoded instruction;

a controller controlling an operation of each of said executing units according to each of said instructions stored in said decoding/storing unit; and a register file outputting register contents specified by said controller to said plurality of executing units, wherein said controller comprises:

a selector selecting an executing unit to which an instruction is to be dispatched from said plurality of executing units according to an instruction stored in said decoding/storing unit and outputting the information concerning selection to said register file; and a dispatch inhibiting unit inhibiting dispatch of an instruction to any of said plurality of executing units according to the decoded instructions by said decoder and the selected executing unit by said selector, wherein said dispatch inhibiting unit does not depend on a following second instruction when a header first instruction of said plurality of instructions is using a particular source operand, and further does not inhibit, when a following third instruction is using said particular source operand identical to that for said first instruction or does not use any source operand, dispatch of said third instruction according to a result of decoding by said decoder as well as to a result of selection by said selector, but said dispatch inhibiting unit inhibits the dispatch of said third instruction in a case other than the cases described above, and in addition, does not inhibit the dispatch of said third instruction when said third instruction is using said particular source operand identical to that for said second instruction or does not use any source operand if said second instruction is using said particular source operand in a state where said first instruction does not use said particular source operand, and inhibits the dispatch of said third instruction in a case other than the cases described above, and on the other hand, if said second instruction does not use said particular source operand, said dispatch inhibiting unit does not inhibit the dispatch of said third instruction regardless of whether said third instruction uses any source operand or not.

5. An information processor comprising:

a plurality of executing units each operating according to each of a plurality of instructions including a source operand to execute the instructions simultaneously;

a decoding/storing unit decoding an input instruction directed to each of said executing units and storing therein the decoded instruction;

a controller controlling an operation of each of said executing units according to each of said instructions stored in said decoding/storing unit; and a register file for outputting register contents specified by said controller to said plurality of executing units, wherein said controller comprises:

a decoder and the selected executing unit by said selector, wherein said dispatch inhibiting unit does not inhibit, when a header first instruction of said plurality of instructions is using a particular source operand, and if a following second instruction is using said particular source operand identical to that for said first instruction or does not use any source operand, dispatch of said second instruction according to a result of decoding by said decoder as well as to a result of selection by said selector, but inhibits the dispatch of said second instruction in a case other than the cases described above, and in addition, said dispatch inhibiting unit does not inhibit the dispatch of said second instruction regardless of whether said second instruction uses any source operand or not when said first instruction does not use said particular source operand.

6. An information processor comprising:

a plurality of executing units each operating according to each of a plurality of instructions including a source operand to execute the instructions simultaneously;

a decoding/storing unit decoding an input instruction directed to each of said executing units and storing therein the decoded instruction;

a controller controlling an operation of each of said executing units according to each of said instructions stored in said decoding/storing unit; and a register file for outputting register contents specified by said controller to said plurality of executing units, wherein said controller comprises:

a decoder receiving an instruction directed to each of said executing units and decoding the instruction;

a selector selecting an executing unit to be activated of said plurality of executing units according to an instruction stored in said decoding/storing unit as well as to a result of decoding by said decoder and outputting the information concerning selection to said register file; and a dispatch inhibiting unit inhibiting dispatch of an instruction to any of said plurality of executing units according to the decoded instructions by said decoder and the selected executing unit by said selector, wherein said dispatch inhibiting unit does not depend on a following second instruction when a header first instruction of said plurality of instructions is using a particular source operand, and further does not inhibit, when a following third instruction is using said particular source operand identical to that for said first instruction or does not use any source operand, dispatch of said third instruction according to a result of decoding by said decoder as well as to a result of selection by said selector, but said dispatch inhibiting unit inhibits the dispatch of said third instruction in a case other than the cases described above, and in addition, does not inhibit the dispatch of said third instruction when said third instruction is using said particular source operand identical to that for said second instruction or does not use any source operand if said second instruction is using said particular source operand in a state where said first instruction does not use said particular source operand, and inhibits the dispatch of said third instruction in a case other than the cases described above, and on the other hand, if said second instruction does not use said particular source operand, said dispatch inhibiting unit.

7. An information processor comprising:

a plurality of executing units simultaneously executing instructions including a first instruction and a second instruction;

a controller controlling operation of each of said executing units according to the instructions;

a register file outputting register contents specified by said controller to said plurality of executing units, wherein said controller comprises, a decoder receiving an instruction and decoding the received instruction;

a selector selecting an executing unit from said plurality of executing units according to the decoding by said decoder and outputting information related to the selected executing unit to said register file; and a dispatch inhibiting unit inhibiting the receiving of an instruction to the selected executing unit according to the decoded instructions by said decoder, wherein, said dispatch inhibiting unit will not inhibit the receiving of an instruction, when one of the following three conditions occurs, a first instruction does not use an index,
a second instruction does not use an index,
the first instruction and the second instruction use identical indexes, said dispatch inhibiting unit will inhibit the receiving of an instruction, when the second instruction does not use an identical index as the first instruction.

8. An information processor comprising:

a plurality of executing units simultaneously executing instructions including a first instruction and a second instruction;

a controller controlling operation of each of said executing units according to the instructions;

a register file outputting register contents specified by said controller to said plurality of executing units, wherein said controller comprises, a decoder receiving an instruction and decoding the received instruction;

a selector selecting an executing unit from said plurality of executing units according to the decoding by said decoder and outputting information related to the selected executing unit to said register file; and a dispatch inhibiting unit that will not inhibit the receiving of an instruction to the selected executing unit according to the decoded instructions by said decoder, when one of the following five conditions occur, a first instruction uses an index and a third instruction uses an identical index as the first instruction;

the first instruction uses an index and the third index does not use an index;

the first instruction does not use an index, a second instruction uses an index, and the third instruction uses an identical index as the first instruction;

the first instruction does not use an index, the second instruction uses an index, and the third instruction does not use an index;

the first instruction does not use an index and the second instruction does not use an index, said dispatch inhibiting unit will inhibit the receiving of an instruction when one of the following two conditions occurs, the first instruction uses an index and the third instruction uses an index not identical to the first instruction, the first instruction does not use an index and the second instruction uses an index and the third instruction uses an index not identical the second instruction.

9. An information processor comprising:

a plurality of executing units simultaneously receiving and executing instructions, the instructions include a first instruction and a second instruction, the first instruction is received at a different executing unit then the second instruction; and a dispatch inhibiting unit that will not inhibit the receiving by an executing unit of an instruction, when one of the following three conditions occurs,
the first instruction does not use an index,
the second instruction does not use an index,
the first instruction and the second instruction use identical indexes,
said dispatch inhibiting unit will inhibit the receiving of an instruction, when the second instruction does not use an identical index as the first instruction.

10. An information processor comprising:
a plurality of executing units simultaneously receiving and executing respective instructions, the instructions include a first instruction and a second instruction, the first instruction is received at a different executing unit then the second instruction;
a dispatch inhibiting unit that will not inhibit the receiving of an instruction by an executing unit, when one of the following five conditions occurs,
a first instruction uses an index and a third instruction uses an identical index as the first instruction;
the first instruction uses an index and the third index does not use an index;
the first instruction does not use an index, a second instruction uses an index, and the third instruction uses an identical index as the first instruction;
the first instruction does not use an index, the second instruction uses an index, and the third instruction does not use an index;
the first instruction does not use an index and the second instruction does not use an index,
said dispatch inhibiting unit will inhibit the receiving of an instruction when one of the following two conditions occurs,
the first instruction uses an index and the third instruction uses an index not identical to the first instruction,
the first instruction does not use an index and the second instruction uses an index and the third instruction uses an index not identical the second instruction.

11. An information processor comprising:
a plurality of executing units simultaneously executing respective instructions including a source operand;
a controller controlling operation of each of said executing units according to the respective instructions;
a register file outputting register contents specified by said controller to said plurality of executing units, wherein said controller comprises,
a decoder receiving an instruction directed to each of said executing units and decoding the received instruction;
a selector selecting an executing unit from said plurality of executing units according to the decoding by said decoder and outputting information related to the selected executing unit to said register file; and
a dispatch inhibiting unit inhibiting the receiving of an instruction to the selected executing unit according to the decoded instructions by said decoder, when a second instruction does not use an identical index as a first instruction.

12. An information processor comprising:
a plurality of executing units simultaneously receiving and executing respective instructions, the instructions include a first instruction and a second instruction, the first instruction is received at a different executing unit then the second instruction; and
a dispatch inhibiting unit inhibiting the receiving by an executing unit of a respective instruction when the second instruction does not use an identical index as the first instruction.

13. An information processor comprising:
a plurality of executing units simultaneously receiving and executing respective instructions, the instructions include a first instruction and a second instruction, the first instruction is received at a different executing unit then the second instruction; and
a dispatch inhibiting unit inhibiting the receiving by an executing unit of a respective instruction, when one of the following two conditions occurs,
the first instruction uses an index and the third instruction uses an index not identical to the first instruction,
the first instruction does not use an index and the second instruction uses an index and the third instruction uses an index not identical the second instruction.

14. An information processor comprising:
a plurality of executing units simultaneously executing respective instructions including a source operand;
a controller controlling operation of each of said executing units according to the respective instructions;
a register file outputting register contents specified by said controller to said plurality of executing units, wherein said controller comprises,
a decoder receiving an instruction directed to each of said executing units and decoding the received instruction;
a selector selecting an executing unit from said plurality of executing units according to the decoding by said decoder and outputting information related to the selected executing unit to said register file; and
a dispatch inhibiting unit inhibiting the receiving of an instruction to the selected executing unit according to the decoded instructions by said decoder, based on the type of indexing the instructions use.

15. An information processor comprising:
a plurality of executing units simultaneously receiving and executing respective instructions; and
a dispatch inhibiting unit inhibiting the receiving by an executing unit of a respective instruction, wherein,
said dispatch inhibiting unit will inhibit the receiving of an instruction based on the type of indexing the instructions use.

* * * * *

UNITED STATES PATENT AND TRADEMARK OFFICE
CERTIFICATE OF CORRECTION

PATENT NO. : 6,141,746
DATED : October 31, 2000
INVENTOR(S) : Hiroshi Kawano, et al.

It is certified that error appears in the above-identified patent and that said Letters Patent is hereby corrected as shown below:

Column 24:
Line 45, change "first" to --second--.

Column 25:
Line 26, change "first" to --second--.

Signed and Sealed this

Twelfth Day of June, 2001

*Attest:*

NICHOLAS P. GODICI
*Attesting Officer      Acting Director of the United States Patent and Trademark Office*

UNITED STATES PATENT AND TRADEMARK OFFICE
CERTIFICATE OF CORRECTION

PATENT NO. : 6,141,746
DATED : October 31, 2000
INVENTOR(S) : Hiroshi Kawano, et al.

It is certified that error appears in the above-identified patent and that said Letters Patent is hereby corrected as shown below:

<u>Column 24</u>:
Line 45, change "first" to --second--.

<u>Column 25</u>:
Line 26, change "first" to --second--.

Signed and Sealed this

Twenty-sixth Day of June, 2001

*Attest:*

*Attesting Officer*

NICHOLAS P. GODICI
*Acting Director of the United States Patent and Trademark Office*